US012649374B2

(12) United States Patent (10) Patent No.: US 12,649,374 B2
Ogihara et al. (45) Date of Patent: Jun. 9, 2026

(54) POWER STORAGE SYSTEM

(71) Applicant: HONDA MOTOR CO., LTD., Tokyo (JP)

(72) Inventors: Yasushi Ogihara, Saitama (JP); Yasuo Yamada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 18/521,546

(22) Filed: Nov. 28, 2023

(65) Prior Publication Data

US 2024/0174090 A1 May 30, 2024

(30) Foreign Application Priority Data

Nov. 30, 2022 (JP) ................................. 2022-192144

(51) Int. Cl.
*H02P 3/12* (2006.01)
*B60L 9/22* (2006.01)
(Continued)

(52) U.S. Cl.
CPC ................. *B60L 50/64* (2019.02); *B60L 9/22* (2013.01); *B60L 2210/14* (2013.01)

(58) Field of Classification Search
CPC ...... H02M 1/32; H02M 7/49; H02M 7/53871; H02M 1/0043; H02M 1/0058;
(Continued)

(56) References Cited

U.S. PATENT DOCUMENTS

2003/0146726 A1* 8/2003 Ishikawa ................. B60L 50/61
903/903
2011/0012543 A1* 1/2011 Takizawa .............. H02M 7/483
318/139
(Continued)

FOREIGN PATENT DOCUMENTS

CN 115091984 A 9/2022
JP 2010-045961 A 2/2010
(Continued)

OTHER PUBLICATIONS

Jul. 2, 2024, Translation of Japanese Office Action issued for related JP Application No. 2022-192144.

*Primary Examiner* — David Luo
*Assistant Examiner* — Charles S Laughlin
(74) *Attorney, Agent, or Firm* — Paratus Law Group, PLLC

(57) ABSTRACT
A power storage system has a battery, a three-phase motor in which coils of three phases are connected at a neutral point, an inverter connected on an electric power transmission path between the battery and the three-phase motor, and a DC power supply circuit connected to a connection portion positioned on an electric power transmission path between the inverter and the battery. The battery includes two power storages and a switch unit that switches between a first voltage state where the two power storages are connected in series and chargeable at a first voltage, and a second voltage state where the two power storages are connected in parallel and chargeable at a second voltage. The DC power supply circuit has a branch circuit connected to a coil of any one phase among the coils of three phases at a positive electrode side of the DC power supply circuit.

4 Claims, 19 Drawing Sheets

(51) Int. Cl.
  B60L 50/64          (2019.01)
  H02P 5/60           (2006.01)
(58) Field of Classification Search
  CPC .. H02M 1/007; H02M 1/0074; H02M 1/0077;
         H02M 3/1552; H02M 3/285; H02M
         3/335; H02M 3/33584; H02M 7/483;
         H02M 7/487; H02M 7/529; H02M 7/797
  See application file for complete search history.

(56)                    References Cited

U.S. PATENT DOCUMENTS

| | | | |
|---|---|---|---|
| 2019/0315234 A1 | 10/2019 | Shin et al. | |
| 2020/0313581 A1 | 10/2020 | Chon et al. | |
| 2020/0361323 A1 | 11/2020 | Chon et al. | |
| 2021/0036643 A1* | 2/2021 | Wang ........................ | B60K 6/48 |
| 2021/0336472 A1 | 10/2021 | Bae et al. | |
| 2022/0355674 A1 | 11/2022 | Yan et al. | |
| 2023/0402870 A1* | 12/2023 | Kamel .................. | H02J 7/1423 |

FOREIGN PATENT DOCUMENTS

| | | | |
|---|---|---|---|
| JP | 2011-250606 A | 12/2011 | |
| JP | 2012-196105 A | 10/2012 | |
| JP | 2013-243898 A | 12/2013 | |
| JP | 2014-093883 A | 5/2014 | |
| JP | 2015-086720 A | 5/2015 | |
| JP | 2019-080474 A | 5/2019 | |
| JP | 2020-150618 A | 9/2020 | |
| JP | 2021-132517 A | 9/2021 | |
| JP | 2021-175363 A | 11/2021 | |
| JP | 2022-087465 A | 6/2022 | |
| JP | 2022-540373 A | 9/2022 | |

* cited by examiner

FIG. 2
(800 V START-UP)
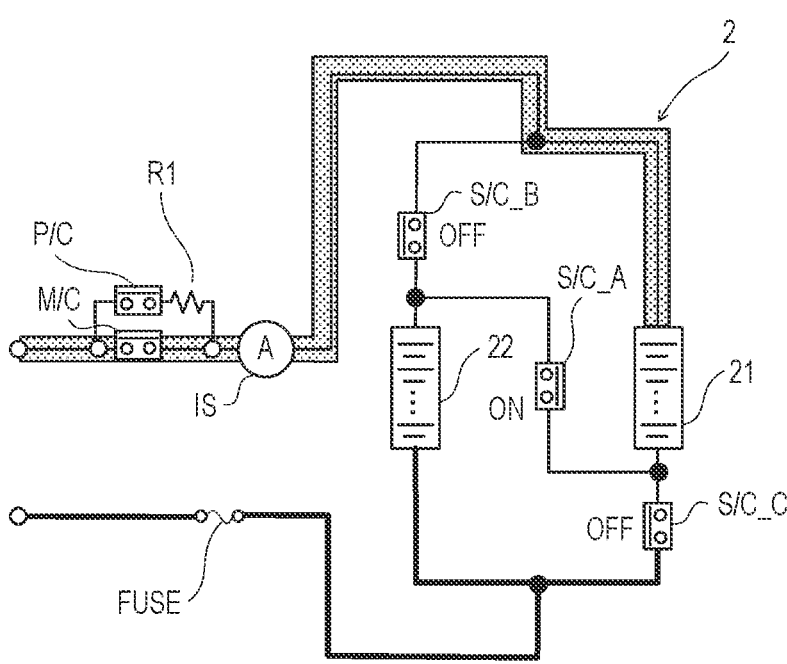
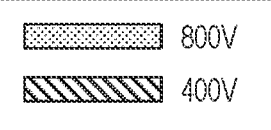

*FIG. 3*
(400 V START-UP)
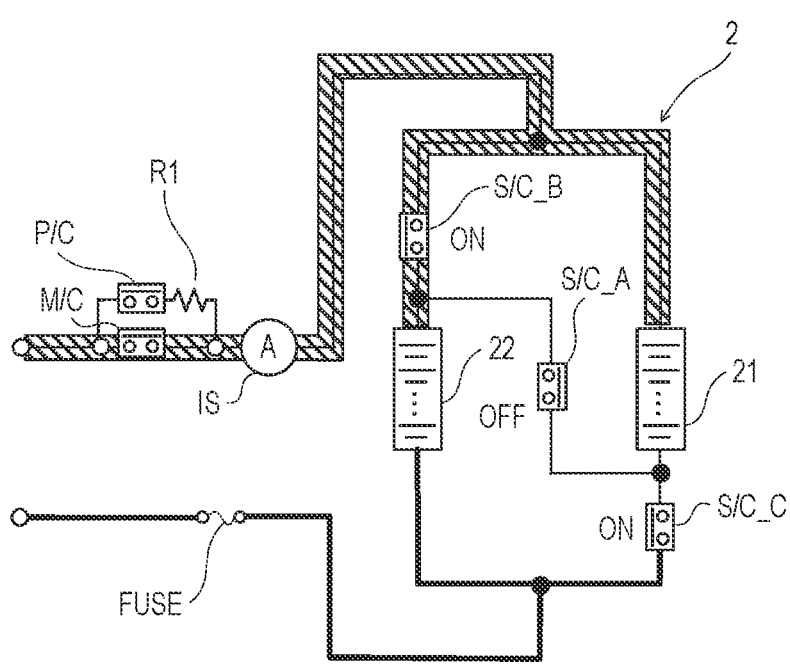
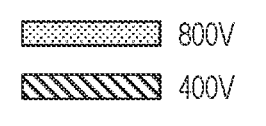

(800 V DRIVE)

(800 V CHARGE)

(400 V CHARGE)

*FIG. 8*

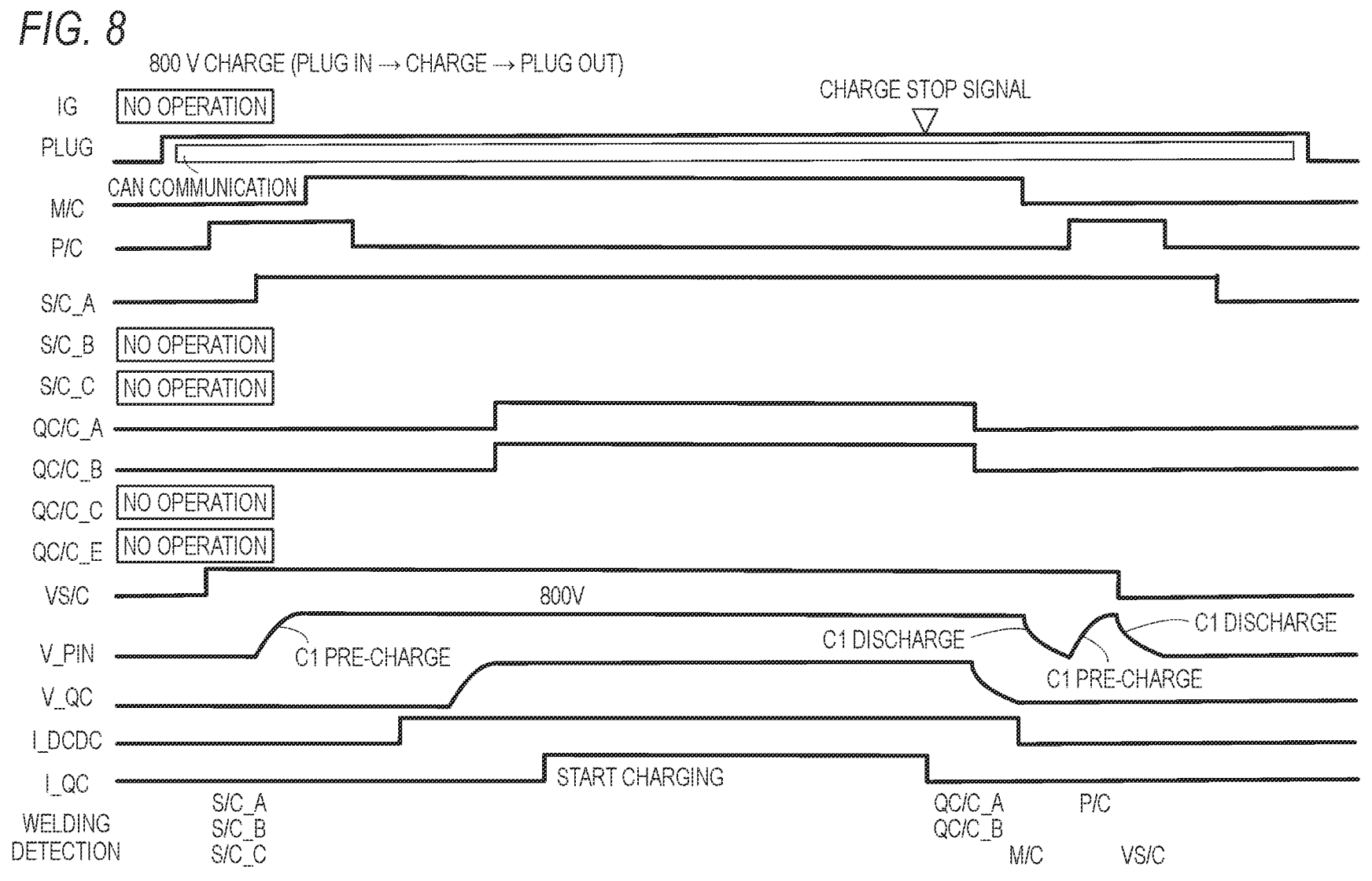

800 V CHARGE (PLUG IN → CHARGE → PLUG OUT)

CHARGE STOP SIGNAL

IG — NO OPERATION

PLUG

M/C — CAN COMMUNICATION

P/C

S/C_A

S/C_B — NO OPERATION

S/C_C — NO OPERATION

QC/C_A

QC/C_B

QC/C_C — NO OPERATION

QC/C_E — NO OPERATION

VS/C

V_PIN — C1 PRE-CHARGE    800V    C1 DISCHARGE

V_QC — C1 DISCHARGE    C1 PRE-CHARGE

I_DCDC

I_QC — START CHARGING

WELDING DETECTION

S/C_A    QC/C_A    P/C
S/C_B    QC/C_B    M/C
S/C_C             VS/C (800 V DRIVE)

(800 V CHARGE)

(400 V CHARGE)

FIG. 14   800 V DRIVE (IG ON → travel → IG OFF)

POWER STORAGE SYSTEM

CROSS-REFERENCE TO RELATED APPLICATIONS

This application is based on and claims priority under 35 USC 119 from Japanese Patent Application No. 2022-192144 filed on Nov. 30, 2022, the entire content of which is incorporated herein by reference.

TECHNICAL FIELD

The present disclosure relates to a power storage system.

BACKGROUND ART

In recent years, researches and developments have been conducted on charging and power supply in a vehicle including a secondary battery which contributes to energy efficiency in order to allow more people to have access to affordable, reliable, sustainable and advanced energy.

In relation to charging and power supply in a vehicle including a secondary battery, there are two types of charging equipment such as charge stations which are compatible with 400 V class and 800 V class, respectively. When a vehicle is compatible with only the 400 V class charging equipment, the vehicle cannot enjoy quick charging performance of the 800 V class charging equipment by the 800 V class charging equipment.

In a case where the vehicle is both compatible with the 400 V class charging equipment and the 800 V class charging equipment, generally, a voltage is boosted to 800 V by a voltage converter when charging by the 400 V class charging equipment, or the voltage is stepped down to 400 V by the voltage converter when charging by the 800 V class charging equipment. However, using such a voltage converter for charging deteriorates efficiency during charging.

In this regard, there is known a vehicle which switches a connection system of a battery module so as to be chargeable by both the 400 V class charging equipment and the 800 V class charging equipment without using any voltage converter for charging (for example, see JP2019-080474A and JP2020-150618A).

In the meantime, there are two types of auxiliary devices used in a vehicle, one is driven at 400 V class and the other one is driven at 800 V class. In the vehicle in which the connection system of the battery module is switched, voltage conversion is generally performed by a voltage converter for an auxiliary device, for example, when a 400 V class auxiliary device is driven during charging by the 800 V class charging equipment, or when an 800 V class auxiliary device is driven during charging by the 400 V class charging equipment. However, such a voltage converter for an auxiliary device is expensive and thus a manufacturing cost increases.

SUMMARY OF INVENTION

The present disclosure provides a power storage system capable of being efficiently charged according to a voltage state of charging equipment while reducing a manufacturing cost.

An aspect of the present disclosure relates to a power storage system including:

a battery including a first power storage, a second power storage, and a first switch unit configured to switch between a first voltage state in which the first power storage and the second power storage are connected in series and chargeable at a first voltage, and a second voltage state in which the first power storage and the second power storage are connected in parallel and chargeable at a second voltage;

a three-phase motor in which coils of three phases are connected at a neutral point, the three-phase motor being driven by electric power supplied from the battery;

an inverter connected on an electric power transmission path between the battery and the three-phase motor, and a DC power supply circuit connected to a first connection portion positioned on an electric power transmission path between the inverter and the battery, in which the DC power supply circuit has a branch circuit connected to a coil of any one phase among the coils of three phases at a positive electrode side of the DC power supply circuit.

According to the present disclosure, the power storage system can be efficiently charged according to a voltage state of charging equipment while reducing a manufacturing cost.

BRIEF DESCRIPTION OF DRAWINGS

Exemplary embodiment(s) of the present invention will be described in detail based on the following figures, wherein:

FIG. 2 is a diagram showing a first voltage state (800 V start-up) of a battery 2;

FIG. 3 is a diagram showing a second voltage state (400 V start-up) of the battery 2;

FIG. 8 is a diagram showing an operation sequence during charging at the first voltage (800 V) of the electric vehicle including the power storage system 1 according to the first embodiment;

DESCRIPTION OF EMBODIMENTS

Hereinafter, embodiments of the present disclosure will be described with reference to the drawings. First, a first embodiment of the present disclosure will be described with reference to FIGS. 1 to 9.

First Embodiment

Figure 1:
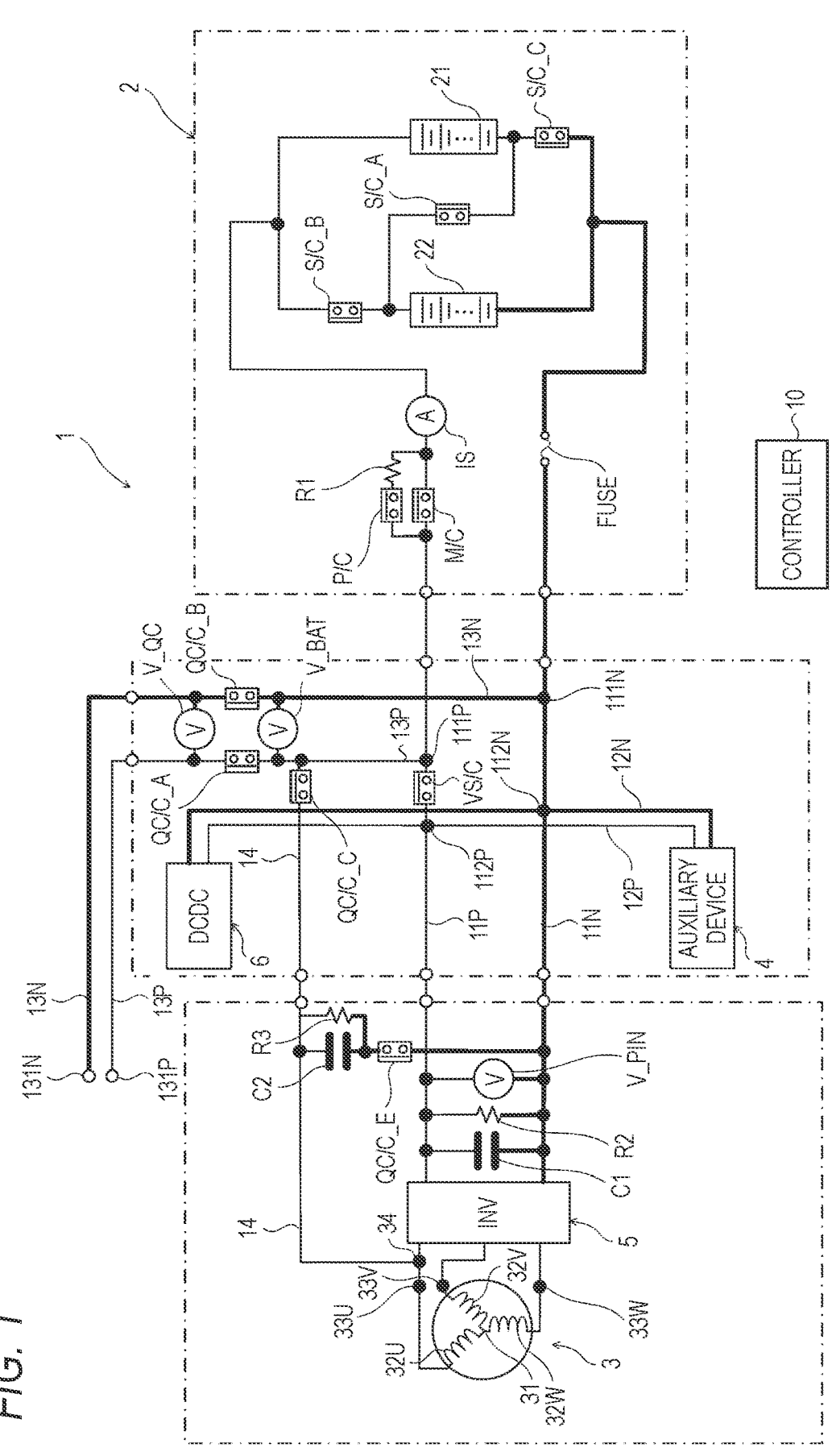
FIG. 1 is a diagram showing a configuration of a power storage system 1 according to a first embodiment.

A power storage system 1 according to a first embodiment shown in FIG. 1 is mounted on an electric vehicle such as an electric automobile. The electric vehicle including the power storage system 1 is compatible with charging equipment of 400 V class and 800 V class. The electric vehicle can not only quickly charge a battery 2 at charge voltages of 400 V and 800 V but also efficiently drive a three-phase motor 3 and an auxiliary device 4 at a base voltage of 800 V.

Specifically, as shown in FIG. 1, the power storage system 1 includes the battery 2, the three-phase motor 3, the auxiliary device 4, an inverter 5 (PDU), a DC-DC converter 6, electric power supply circuits 11P and 11N, auxiliary device drive circuits 12P and 12N, DC power supply circuits 13P and 13N, a branch circuit 14, and a controller 10.

As shown in FIGS. 1 to 3, the battery 2 includes a first power storage 21, a second power storage 22, first to fifth contactors M/C, S/C_A, S/C_B, S/C_C, P/C, a first resistor R1, a current sensor IS, and a current breaker FUSE.

The first power storage 21 and the second power storage 22 are battery modules which can perform charging and discharging of 400 V.

The first contactor M/C is provided on a positive end portion of the battery 2 and functions as a main switch which turns on and off connection to the outside (the electric power supply circuit 11P) of the battery 2.

The second to fourth contactors S/C_A, S/C_B, and S/C_C switch a connection state between the first power storage 21 and the second power storage 22. For example, as shown in FIG. 2, when the second contactor S/C_A is turned on whereas the third contactor S/C_B and the fourth contactor S/C_C are turned off, the battery 2 is in a first voltage state (800 V start-up) in which the first power storage 21 and the second power storage 22 are connected in series, so that the battery 2 can perform charging and discharging at 800 V. As shown in FIG. 3, when the second contactor S/C_A is turned off whereas the third contactor S/C_B and the fourth contactor S/C_C are turned on, the battery 2 is in a second voltage state (400 V start-up) in which the first power storage 21 and the second power storage 22 are connected in parallel, so that the battery 2 can perform charging and discharging at 400 V. Note that the term start-up refers to a concept including driving during traveling of an electric vehicle including the power storage system 1 and charging during parking of the electric vehicle. The second to fourth contactors S/C_A, S/C_B, and S/C_C constitute an example of a first switch unit configured to switch between the first voltage state (800 V start-up) and the second voltage state (400 V start-up).

The fifth contactor P/C and the first resistor R1 are arranged in series with each other and in parallel with the first contactor M/C. In the first voltage state and the second voltage state, the fifth contactor P/C is turned on before the first contactor M/C is turned on, thereby protecting the first contactor M/C from an excessive inrush current.

The current sensor IS is provided between the first contactor M/C and the power storages 21 and 22 to measure a current.

The current breaker FUSE is provided on a negative end portion of the battery 2 and cuts off the connection to the outside (the electric power supply circuit 11N) of the battery 2 when an abnormality occurs. In the power storage system 1 according to the present embodiment, the current breaker FUSE is implemented by a pyro-fuse which can intentionally cut off a current according to an electrical signal. When an abnormality occurs (for example, vehicle collision or a short circuit in the battery 2), the current breaker FUSE performs a cut-off operation, and all the contactors in the battery 2 are turned off (opened).

Accordingly, when an abnormality occurs, the connection to the outside can be cut off on both the positive and negative end sides of the battery 2, and additionally, in both the first voltage state (800 V start-up) and the second voltage state (400 V start-up), reliable circuit cut-off can be performed by turning off the plurality of contactors on the circuit even when contactor welding occurs. Since a pyro-fuse is used as the current breaker FUSE, it is not necessary to provide a contactor on the negative end portion of the battery 2, and thus the number of components and a cost can be reduced.

The three-phase motor 3 includes coils 32U, 32V, and 32W of three phases, one end side of each of which is connected to a neutral point 31, and is rotationally driven by electric power supplied from the battery 2 via the inverter 5. The three-phase motor 3 in the present embodiment includes a U-phase terminal 33U, a V-phase terminal 33V, and a NV-phase terminal 33W connected to the other end side of each of the coils 32U, 32V, and 32W, respectively. The U-phase terminal 33U, the V-phase terminal 33V, and the W-phase terminal 33W are connected to the inverter 5. The other end side of a coil of any one phase among the coils 32U, 32V, 32W is connected to the branch circuit 14 at a connection portion 34. In the present embodiment, the coil 32U among the coils 32U, 32V, and 32W of three phases is connected to the branch circuit 14 at the connection portion 34 positioned between the U-phase terminal 33U and the inverter 5.

The inverter 5 converts DC electric power supplied from the battery 2 into three-phase AC electric power by switching a plurality of switching elements, so as to rotationally drive the three-phase motor 3. When a DC (400 V) is supplied from the branch circuit 14 to the connection portion

34, the inverter 5 can function as a booster circuit by switching the plurality of switching elements to boost the DC (to 800 V) using the coil connected to the branch circuit 14 and the coil of another phase (in the present embodiment, the coils 32U and 32V or the coils 32U and 32W). That is, the coils 32U, 32V, and 32W wound around a stator core are used as transformers. The inverter 5 allows a current to flow from the three-phase motor 3 side to the battery 2 side regardless of on and off of a gate, and allows a current to flow from the battery 2 side to the three-phase motor 3 side only when the gate is on.

The auxiliary device 4 is a high-voltage driven in-vehicle device which can be driven by DC electric power from the battery 2 and an example power supply, and examples thereof includes an electric compressor or a heater for air-conditioning. The auxiliary device 4 is connected to the battery 2 via the auxiliary device drive circuits 12P and 12N, a seventh contactor VS/C, and the electric power supply circuits 11P and 11N, which will be described later. The seventh contactor VS/C is an example of a third switch unit. The auxiliary device 4 according to the present embodiment is operated at the base voltage of 800 V.

The DC-DC converter 6 steps down DC electric power from the battery 2 and the external power supply to drive a low-voltage driven in-vehicle device. The DC-DC converter 6 is provided with an ammeter (not shown).

The electric power supply circuits 11P and 11N are configured as a positive and negative pair and connect the battery 2 and the inverter 5 (three-phase motor 3). The electric power supply circuits 11P and 11N are provided with connection portions 111P and 111N connected to the DC power supply circuits 13P and 13N and are provided with connection portions 112P and 112N connected to the auxiliary device drive circuits 12P and 12N (auxiliary device 4) on a side closer to the inverter 5 than the connection portions 111P and 111N. The electric power supply circuit 11P at the positive side is provided with the seventh contactor VS/C which turns on and off the circuit between the connection portion 112P connected to the auxiliary device drive circuit 12P and the connection portion 111P connected to the DC power supply circuit 13P. A first voltage sensor V_PIN, a first smoothing capacitor C1 and a second resistor R2 are provided on the inverter 5 side of the electric power supply circuits 11P and 11N. The first voltage sensor V_PIN, the first smoothing capacitor C1, and the second resistor R2 are provided on a circuit that connects the electric power supply circuit 11P at the positive side and the electric power supply circuit 11N at the negative side. Note that the second resistor R2 is provided to discharge the first smoothing capacitor C1 when the circuit is cut off.

On a circuit connecting the electric power supply circuit 11N on the negative side and the branch circuit 14, an eleventh contactor QC/C_E for turning on and off this circuit and a second smoothing capacitor C2 are provided in series. On a circuit parallel to the second smoothing capacitor C2, a third resistor R3 is provided for discharging the second smoothing capacitor C2 when the circuit is cut off.

The DC power supply circuits 13P and 13N are configured as a positive and negative pair and include one end provided with charge terminals 131P and 131N to which an external power supply such as charging equipment can be connected and the other end connected to the electric power supply circuits 11P and 11N via the connection portions 111P and 111N. The DC power supply circuits 13P and 13N are provided with an eighth contactor QC/C_A and a ninth contactor QC/C_B for turning on and off the circuits, respectively. A second voltage sensor V_BAT is provided at a position closer to the connection portions 111P and 111N than the eighth contactor QC/C_A and the ninth contactor QC/C_B. A third voltage sensor V_QC is provided at a position closer to the charge terminals 131P and 131N than the eighth contactor QC/C_A and the ninth contactor QC/C_B.

The branch circuit 14 is branched, in the DC power supply circuit 13P at the positive side, at a position closer to the connection portion 111P than the eighth contactor Q/C_A and the second voltage sensor V_BAT and is connected to one of the coils of the three-phase motor 3 via the connection portion 34. An intermediate portion of the branch circuit 14 is provided with a tenth contactor QC/C_C for turning on and off the circuit. The tenth contactor QC/C_C is an example of a second switch unit.

The controller 10 is, for example, a vehicle ECU and controls driving and charging of the power storage system 1. More specifically, the controller 10 performs on and off control of the contactors M/C, S/C_A, S/C_B, S/C_C, P/C, VS/C, QC/C_A, QC/C_B, QC/C_C, and QC/C_E, detection of welding of these contactors, and control of the DC-DC converter 6 and the inverter 5.

Next, an operation of the power storage system 1 will be described with reference to FIGS. 4 to 9.

Figure 4:
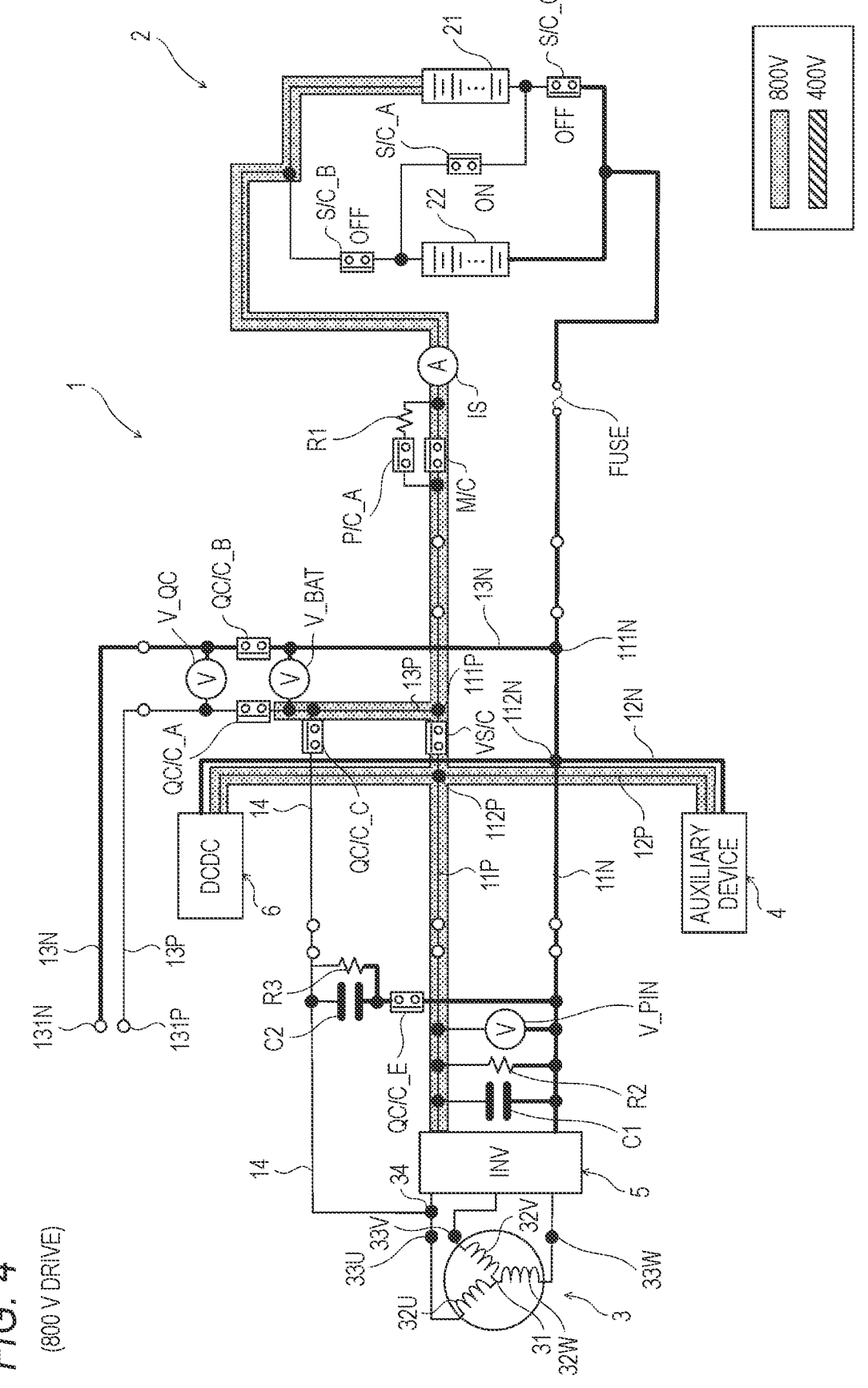
FIG. 4 is a diagram showing a flow of a current during traveling of an electric vehicle including the power storage system 1 according to the first embodiment.
Figure 7:
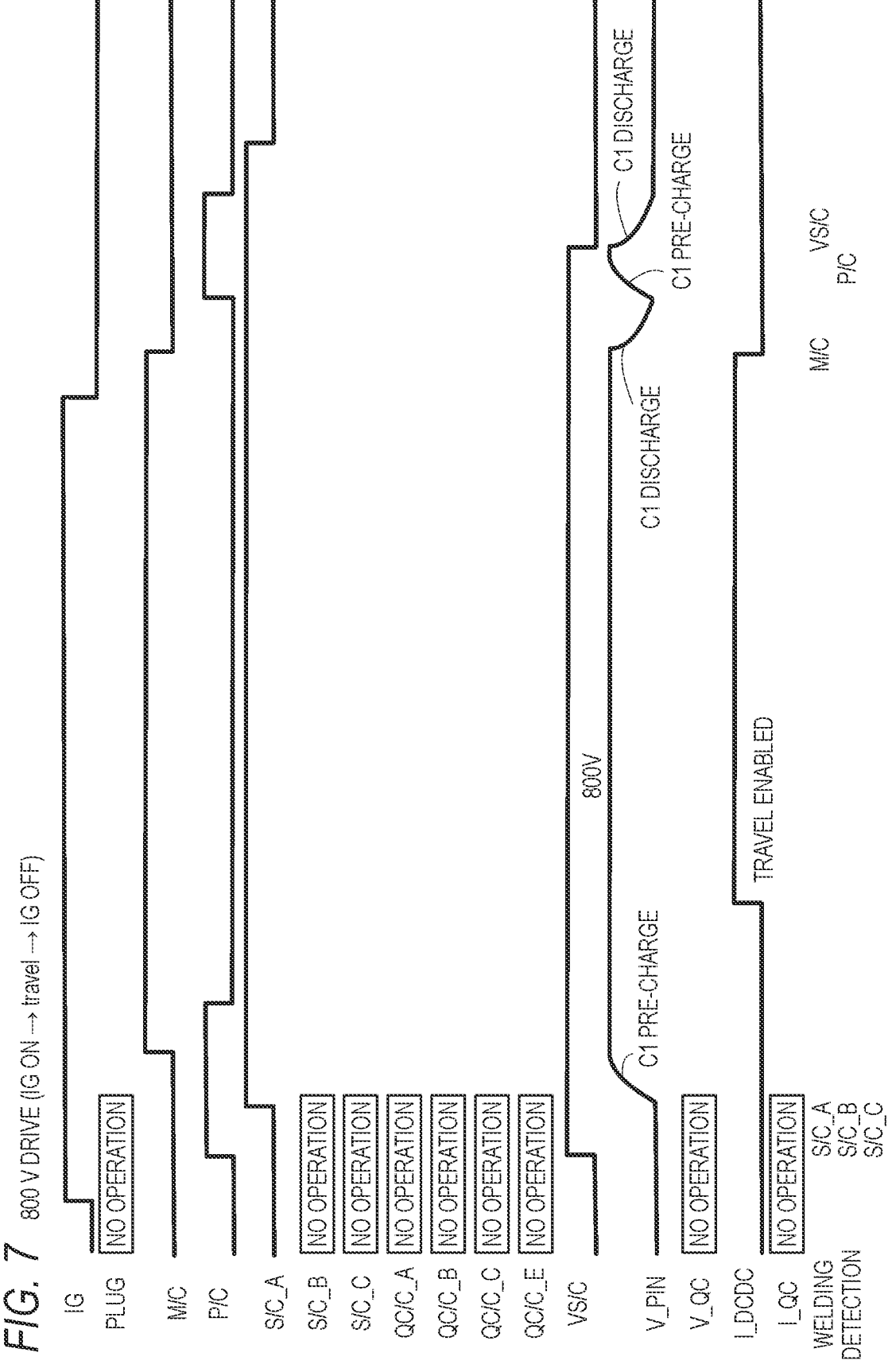
FIG. 7 is a diagram showing an operation sequence during traveling of the electric vehicle including the power storage system 1 according to the first embodiment.

FIG. 4 is a diagraming showing a flow of a current during traveling (800 V drive) of the electric vehicle including the power storage system 1 according to the first embodiment, and FIG. 7 is a diagram showing an operation sequence during traveling (800 V drive) of the electric vehicle including the power storage system 1 according to the first embodiment.

When an ignition switch IG of the electric vehicle is turned on, the controller 10 first turns on the fifth contactor P/C and the seventh contactor VS/C and checks a detected voltage value of the first voltage sensor V_PIN. When the detected voltage value of the first voltage sensor V_PIN increases, the controller 10 determines that any one of the second to fourth contactors S/C_A, S/C_B, and S/C_C is welded, and performs abnormality notification.

When the controller 10 determines that the second to fourth contactors S/C_A, S/C_B, and S/C_C are not welded, the controller 10 turns on the second contactor S/C_A and connects the circuit in the battery 2 in the first voltage state (800 V). When the circuit in the battery 2 is connected in the first voltage state (800 V), the first smoothing capacitor C1 is pre-charged, and the detected voltage value of the first voltage sensor V_PIN gradually increases.

The controller 10 turns on the first contactor M/C to activate the battery 2 in the first voltage state (800 V) at a timing when the pre-charging of the first smoothing capacitor C1 is completed, and then turns off the fifth contactor P/C. Accordingly, travel of the electric vehicle is enabled. In this case, the auxiliary device 4 is connected to the electric power supply circuits 11P and 11N via the auxiliary device drive circuits 12P and 12N and is driven by the first voltage (800 V) supplied from the battery 2.

On the other hand, when the ignition switch IG is turned off, the controller 10 first turns off the first contactor M/C and checks the detected voltage value of the first voltage sensor V_PIN. When the detected voltage value of the first voltage sensor V_PIN does not decrease due to discharging of the first smoothing capacitor C1, the controller 10 determines that the first contactor M/C is welded and performs abnormality notification.

When the controller 10 determines that the first contactor M/C is not welded, the controller 10 turns on the fifth contactor P/C at a timing when the discharging of the first smoothing capacitor C1 is completed, and checks the detected voltage value of the first voltage sensor V_PIN. When the detected voltage value of the first voltage sensor V_PIN does not increase, the controller 10 determines that the fifth contactor P/C is welded and performs abnormality notification.

When the controller 10 determines that the fifth contactor P/C is not welded, the controller 10 turns off the seventh contactor VS/C and checks the detected voltage value of the first voltage sensor V_PIN. When the detected voltage value of the first voltage sensor V_PIN does not decrease, the controller 10 determines that the seventh contactor VS/C is welded and performs abnormality notification.

When the controller 10 determines that the seventh contactor VS/C is not welded, the controller 10 turns off the fifth contactor P/C and the second contactor S/C_A and ends the operation sequence during traveling.

Figure 5:
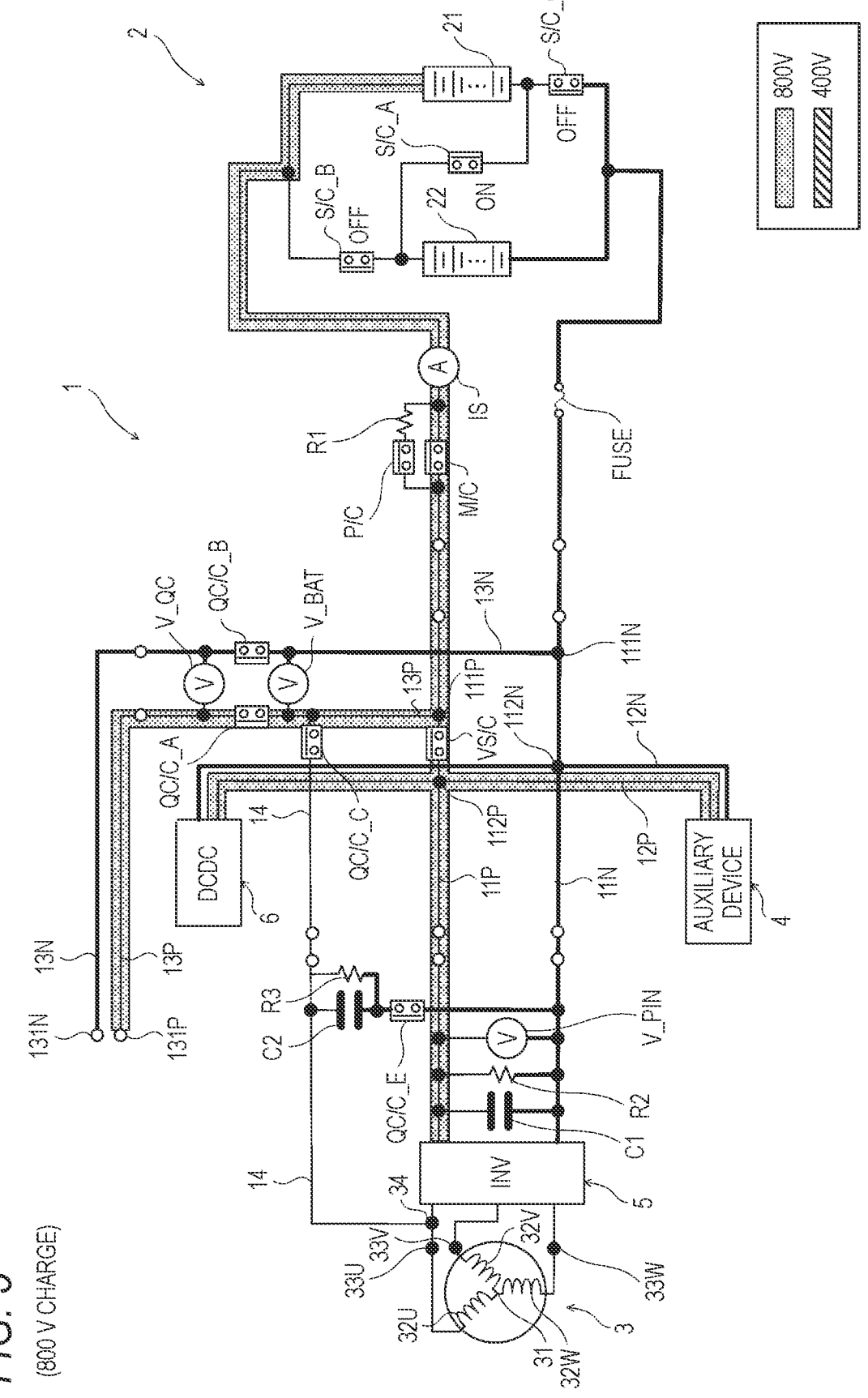
FIG. 5 is a diagram showing a flow of a current during charging at a first voltage (800 V) of the electric vehicle including the power storage system 1 according to the first embodiment.

FIG. 5 is diagram showing a flow of a current during charging at the first voltage (800 V charge) of the electric vehicle including the power storage system 1 according to the first embodiment, and FIG. 8 is a diagram showing an operation sequence during charging at the first voltage (800 V charge) of the electric vehicle including the power storage system 1 according to the first embodiment.

When a charge plug is connected to the charge terminals 131P and 131N, the controller 10 performs CAN communication with charging equipment to recognize a charge voltage. When the charge voltage is the first voltage (800 V), the controller 10 first turns on the fifth contactor P/C and the seventh contactor VS/C and checks the detected voltage value of the first voltage sensor V_PIN. When the detected voltage value of the first voltage sensor V_PIN increases, the controller 10 determines that any one of the second to fourth contactors S/C_A, S/C_B, and S/C_C is welded, and performs abnormality notification.

When the controller 10 determines that the second to fourth contactors S/C_A, S/C_B, and S/C_C are not welded, the controller 10 turns on the second contactor S/C_A and connects the circuit in the battery 2 in the first voltage state (800 V). When the circuit in the battery 2 is connected in the first voltage state (800 V), the first smoothing capacitor C1 is pre-charged, and the detected voltage value of the first voltage sensor V_PIN gradually increases.

The controller 10 turns on the first contactor M/C to activate the battery 2 in the first voltage state (800 V) after the pre-charging of the first smoothing capacitor C1 is completed, and then turns off the fifth contactor P/C. Accordingly, the battery 2 is in a state in which charging at the first voltage (800 V) can be started.

Thereafter, the controller 10 turns on the eighth contactor QC/C_A and the ninth contactor QC/C_B to start charging the battery 2 at the first voltage (800 V). In this case, the auxiliary device 4 is connected to the DC power supply circuits 13P and 13N via the auxiliary device drive circuits 12P and 12N and the seventh contactor VS/C and is driven by the first voltage (800 V) supplied from the charging equipment.

On the other hand, when the controller 10 determines that a charge stop signal is received, the controller 10 turns off the eighth contactor Q/C_A and the ninth contactor QC/C_B and checks a detected voltage value of the third voltage sensor V_QC. When the detected voltage value of the third voltage sensor V_QC does not decrease, the controller 10 determines that the eighth contactor QC/C_A and the ninth contactor QC/C_B are welded and performs abnormality notification.

When the controller 10 determines that the eighth contactor QC/C_A and the ninth contactor QC/C_B are not welded, the controller 10 turns off the first contactor M/C and checks the detected voltage value of the first voltage sensor V_PIN. When the detected voltage value of the first voltage sensor V_PIN does not decrease due to discharging of the first smoothing capacitor C1, the controller 10 determines that the first contactor M/C is welded and performs abnormality notification.

When the controller 10 determines that the first contactor M/C is not welded, the controller 10 turns on the fifth contactor P/C at a timing when the discharging of the first smoothing capacitor C1 is completed, and checks the detected voltage value of the first voltage sensor V_PIN. When the detected voltage value of the first voltage sensor V_PIN does not increase, the controller 10 determines that the fifth contactor P/C is welded and performs abnormality notification.

When the controller 10 determines that the fifth contactor P/C is not welded, the controller 10 turns off the seventh contactor VS/C at a timing when the pre-charging of the first smoothing capacitor C1 is completed, and checks the detected voltage value of the first voltage sensor V_PIN. When the detected voltage value of the first voltage sensor V_PIN does not decrease, the controller 10 determines that the seventh contactor VS/C is welded and performs abnormality notification.

When the controller 10 determines that the seventh contactor VS/C is not welded, the controller 10 turns off the fifth contactor P/C and the second contactor S/C_A and ends the operation sequence during charging at the first voltage (800 V).

Figure 6:
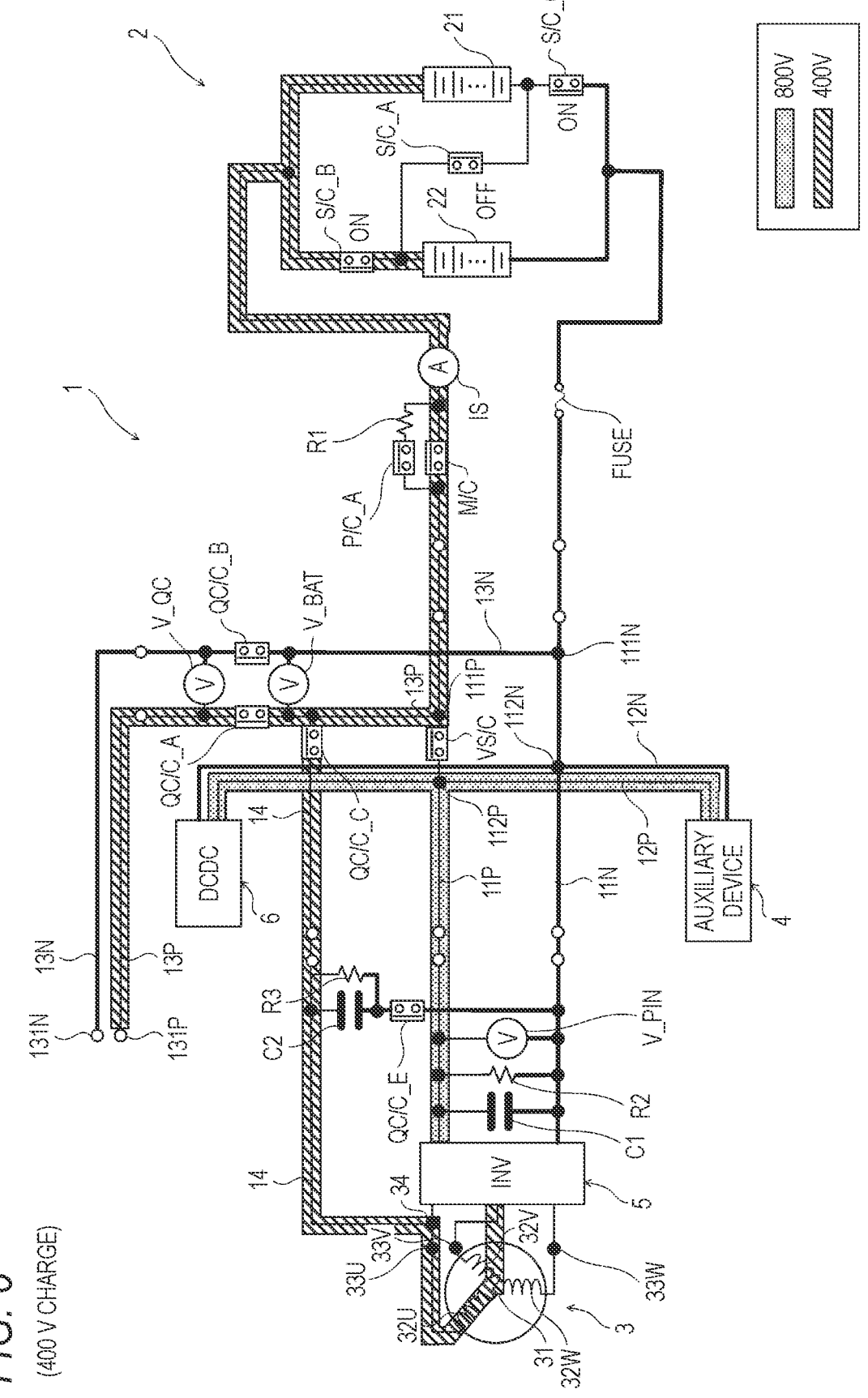
FIG. 6 is a diagram showing a flow of a current during charging at a second voltage (400 V) of the electric vehicle including the power storage system 1 according to the first embodiment.
Figure 9:
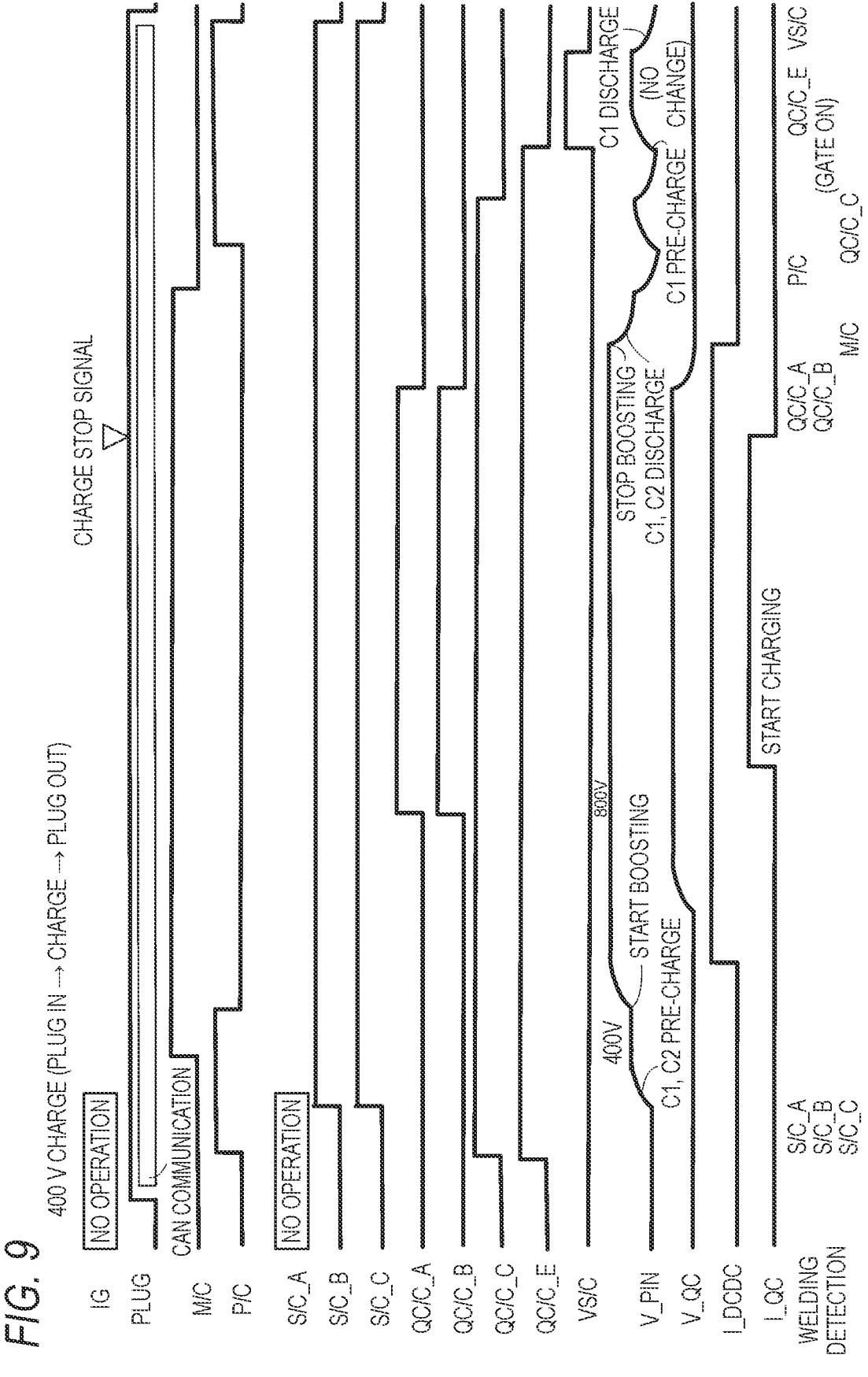
FIG. 9 is a diagram showing an operation sequence during charging at the second voltage (400 V) of the electric vehicle including the power storage system 1 according to the first embodiment.

FIG. 6 is a diagram showing a flow of a current during charging at the second voltage (400 V charge) of the electric vehicle including the power storage system 1 according to the first embodiment, and FIG. 9 is a diagram showing an operation sequence during charging at the second voltage (400 V charge) of the electric vehicle including the power storage system 1 according to the first embodiment.

When a charge plug is connected to the charge terminals 131P and 131N, the controller 10 performs CAN communication with charging equipment to recognize a charge voltage. When the charge voltage is the second voltage (400 V), the controller 10 turns on the fifth contactor P/C, the tenth contactor QC/C_C and the eleventh contactor QC/C_E, and checks the detected voltage value of the first voltage sensor V_PIN. When the detected voltage value of the first voltage sensor V_PIN increases, the controller 10 determines that any one of the second to fourth contactors S/C_A, S/C_B, and S/C_C is welded, and performs abnormality notification.

When the controller 10 determines that there is no welding of the second to fourth contactors S/C_A, S/C_B, and S/C_C, the controller 10 turns on the third contactor S/C_B and the fourth contactor S/C_C to connect the circuit in the battery 2 in the second voltage state (400 V), and then turns on the first contactor M/C and turns off the fifth contactor P/C to start the battery 2 in the second voltage state (400 V). After enabling the booster circuit by the three-phase motor 3 and the inverter 5, the controller 10 turns on the eighth contactor QC/C_A and the ninth contactor QC/C_B. Accordingly, the battery 2 is in a state in which charging at the second voltage (400 V) can be started. The three-phase motor 3 and the inverter 5 connected to the DC power supply circuits 13P and 13N via the branch circuit 14 boost the second voltage (400 V) supplied from the charging equipment to the first voltage (800 V) to drive the auxiliary device 4.

On the other hand, when the controller 10 determines that a charge stop signal is received, the controller 10 turns off the eighth contactor QC/C_A and the ninth contactor QC/C_B and checks a detected voltage value of the third voltage sensor V_QC. When the detected voltage value of the third voltage sensor V_QC does not decrease, the controller 10 determines that the eighth contactor QC/C_A and the ninth contactor QC/C_B are welded and performs abnormality notification.

When the controller 10 determines that the eighth contactor QC/C_A and the ninth contactor QC/C_B are not welded, the controller 10 stops the boosting performed by the three-phase motor 3 and the inverter 5, then turns off the first contactor M/C and checks the detected voltage value of the first voltage sensor V_PIN. When the detected voltage value of the first voltage sensor V_PIN does not decrease, the controller 10 determines that the first contactor M/C is welded and performs abnormality notification.

When the controller 10 determines that the first contactor M/C is not welded, the controller 10 turns on the fifth contactor P/C and checks the detected voltage value of the first voltage sensor V_PIN. When the detected voltage value of the first voltage sensor V_PIN does not increase, the controller 10 determines that the fifth contactor P/C is welded and performs abnormality notification.

When the controller 10 determines that the fifth contactor P/C is not welded, the controller 10 turns off the tenth contactor QC/C_C and checks the detected voltage value of the first voltage sensor V_PIN. When the detected voltage value of the first voltage sensor V_PIN does not decrease, the controller 10 determines that the tenth contactor QC/C_C is welded and performs abnormality notification.

When the controller 10 determines that the tenth contactor QC/C_C is not welded, the controller 10 turns off the eleventh contactor QC/C_E and turns on the seventh contactor VS/C, and checks the detected voltage value of the first voltage sensor V_PIN. After the detected voltage value of the first voltage sensor V_PIN is increased by the pre-charging of the first smoothing capacitor C1, the controller 10 turns on the gate of the inverters and checks the detected voltage value of the first voltage sensor V_PIN again. When the detected voltage value of the first voltage sensor V_PIN changes in response to the turn-on of the gate of the inverter 5, the controller 10 determines that the eleventh contactor QC/C_E is welded, and performs abnormality notification.

When the controller 10 determines that the eleventh contactor QC/C_E is not welded, the controller 10 turns off the seventh contactor VS/C and checks the detected voltage value of the first voltage sensor V_PIN. When the detected voltage value of the first voltage sensor V_PIN does not decrease, the controller 10 determines that the seventh contactor VS/C is welded and performs abnormality notification.

When the controller 10 determines that the seventh contactor VS/C is not welded, the controller 10 turns off the fifth contactor P/C, the third contactor S/C_B and the fourth contactor S/C_C and ends the operation sequence during charging at the second voltage (400 V).

Second Embodiment

Next, the power storage system 1 according to the second embodiment will be described with reference to FIGS. 10 to 16. Here, the same reference numerals as in the first embodiment are used for the same configurations as in the first embodiment, and the description of the first embodiment may be incorporated.

Figure 10:
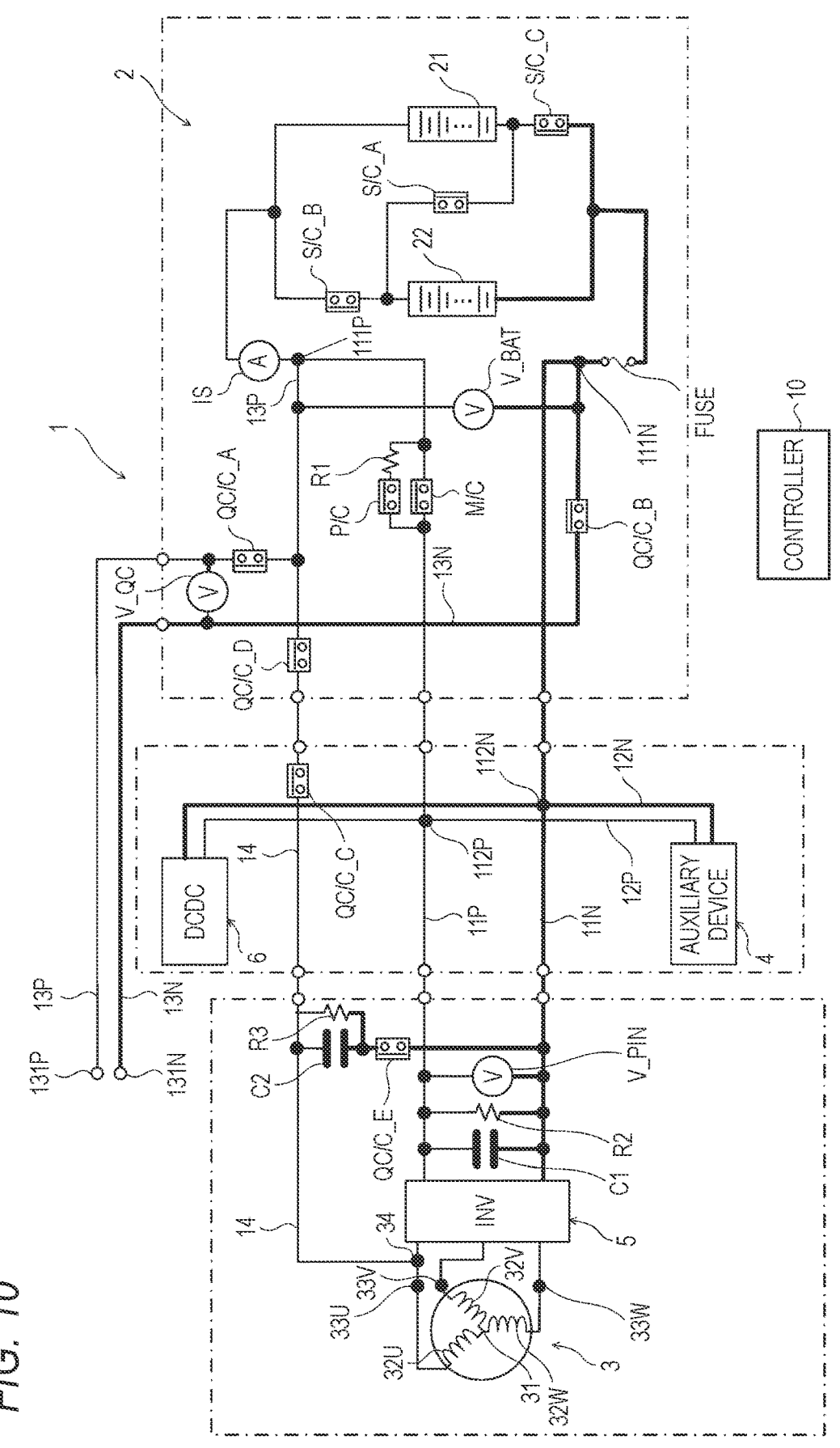
FIG. 10 is a diagram showing a configuration of an electric vehicle including the power storage system 1 according to a second embodiment.

In the power storage system 1 according to the first embodiment, the eighth contactor QC/C_A which is a main switch for charging is connected in series to the first contactor M/C which is the main switch of the battery 2. However, in the power storage system 1 according to the second embodiment, the eighth contactor QC/C_A is connected in parallel to the first contactor M/C as shown in FIG. 10.

In the power storage system 1 according to the second embodiment, the same effect as those of the power storage system 1 according to the first embodiment can be obtained based on an operation according to an operation sequence to be described later. In the power storage system 1 according to the second embodiment, during charging with the second voltage (400 V), the battery 2 charged with the second voltage (400 V) can be separated, by the first contactor M/C, from the first voltage (800 V) boosted by the three-phase motor 3 and the inverter 5 and thus no switch component corresponding to the seventh contactor VS/C in the first embodiment is required.

The second embodiment is similar to the first embodiment in that the second to fourth contactors S/C_A, S/C_B, and S/C_C constitute an example of the first switch unit and the tenth contactor QC/C_C is an example of the second switch unit, and is different from the first embodiment in that the first contactor M/C is an example of the third switch unit.

In the power storage system 1 according to the second embodiment, it is assumed that the eighth contactor QC/C_A, the ninth contactor QC/C_B, the second voltage sensor V_BAT, and the third voltage sensor V_QC are disposed in the battery 2 and the branch circuit 14 is drawn out from inside the battery 2. Therefore, a twelfth contactor QC/C_D is provided in the battery 2 at a position closer to the inverter 5 than a position in the vicinity of the branch of the branch circuit 14 in order to cut off connection with the outside of the battery when an abnormality occurs.

Next, an operation of the power storage system 1 according to the second embodiment will be described with reference to FIGS. 11 to 16.

Figure 11:
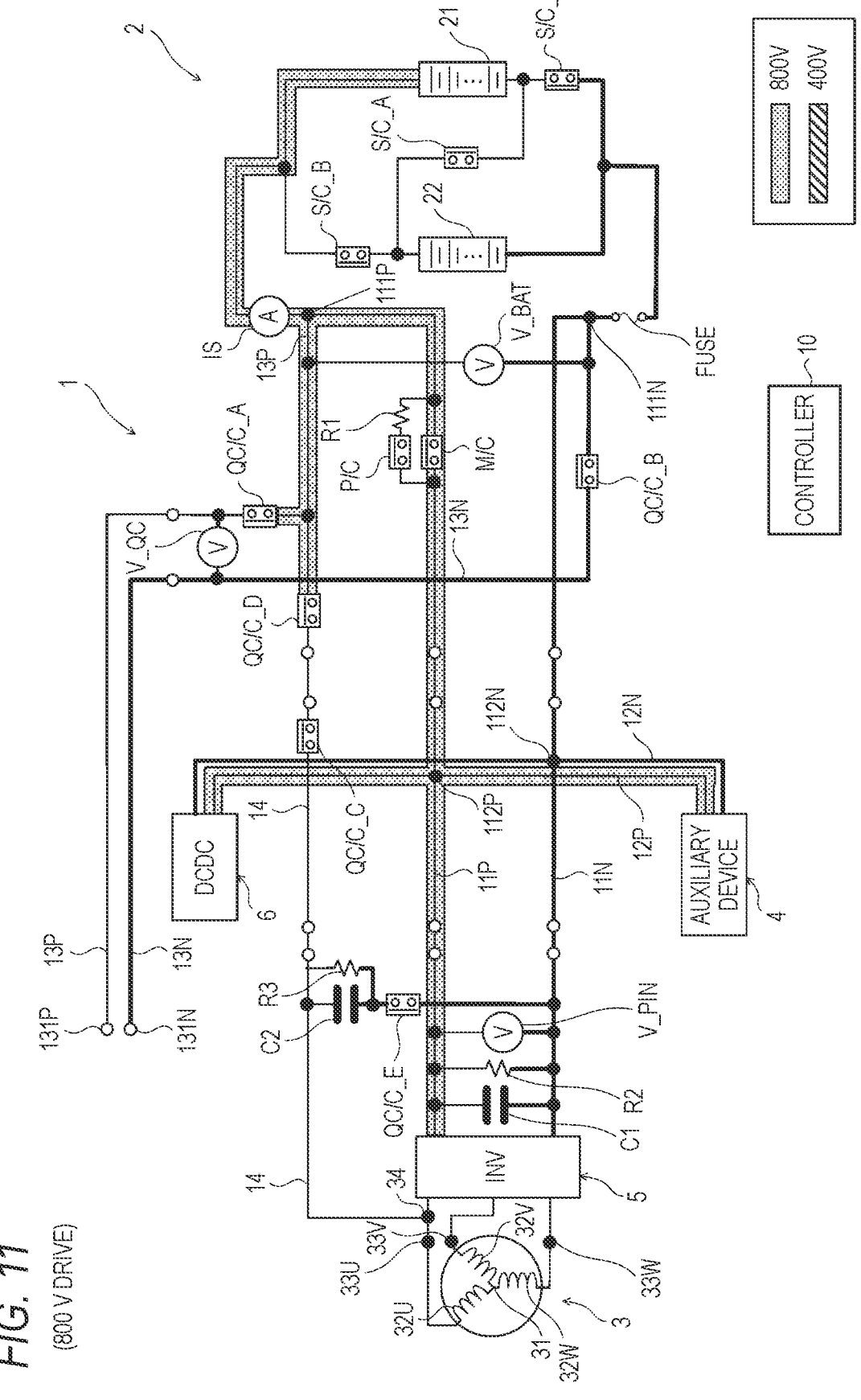
FIG. 11 is a diagram showing a flow of a current during traveling of the electric vehicle including the power storage system 1 according to the second embodiment.
Figure 14:
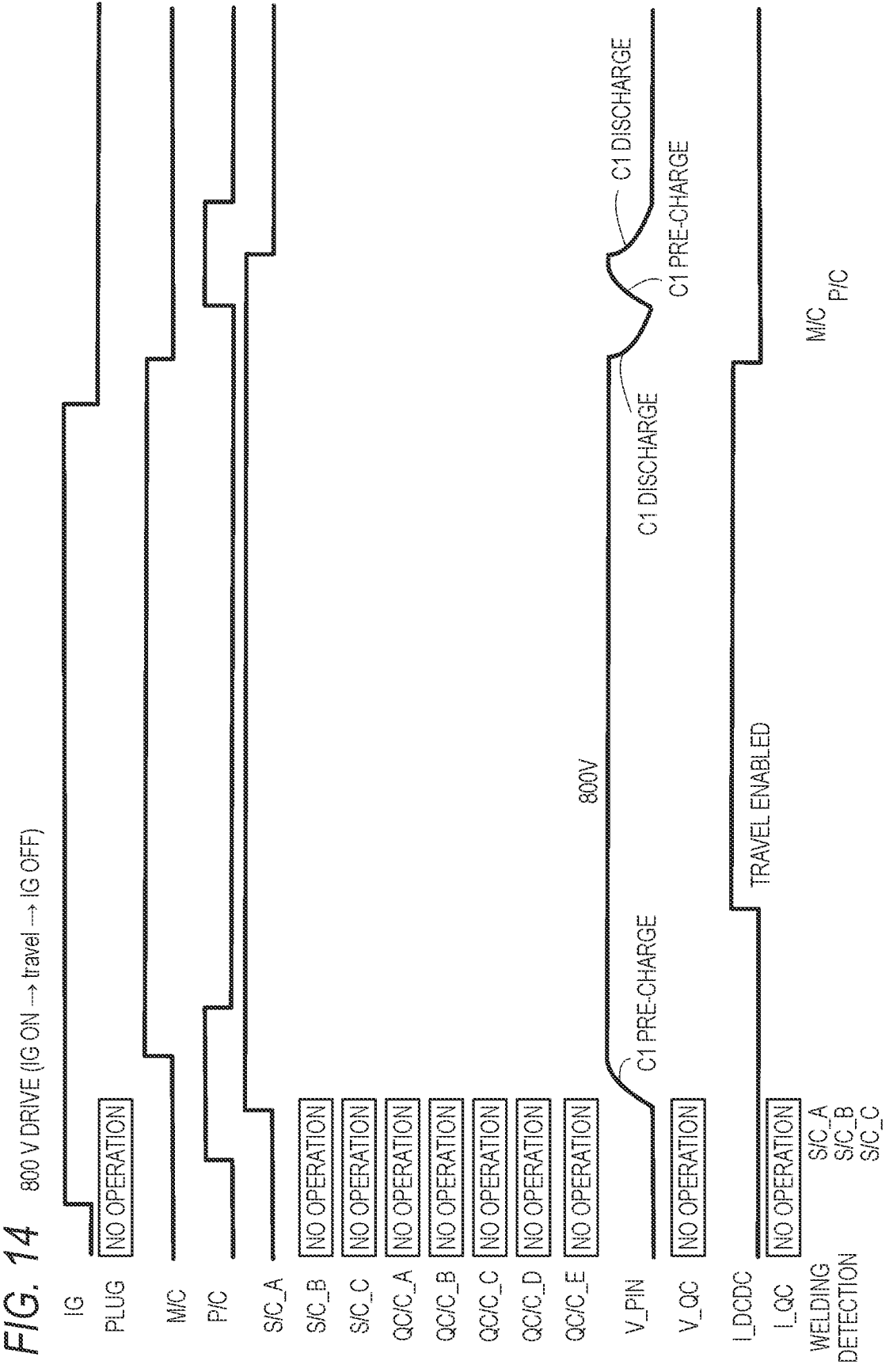
FIG. 14 is a diagram showing an operation sequence during traveling of the electric vehicle including the power storage system 1 according to the second embodiment.

FIG. 11 is a diagram showing a flow of a current during traveling (800 V drive) of the electric vehicle including the power storage system 1 according to the second embodiment, and FIG. 14 is a diagram showing an operation sequence during traveling (800 V drive) of the electric vehicle including the power storage system 1 according to the second embodiment.

When the ignition switch IG of the electric vehicle is turned on, the controller 10 first turns on the fifth contactor P/C and checks the detected voltage value of the first voltage sensor V_PIN. When the detected voltage value of the first voltage sensor V_PIN increases, the controller 10 determines that any one of the second to fourth contactors S/C_A, S/C_B, and S/C_C is welded, and performs abnormality notification.

When the controller 10 determines that the second to fourth contactors S/C_A, S/C_B, and S/C_C are not welded, the controller 10 turns on the second contactor S/C_A and connects the circuit in the battery 2 in the first voltage state (800 V). When the circuit in the battery 2 is connected in the first voltage state (800 V), the first smoothing capacitor C1 is pre-charged, and the detected voltage value of the first voltage sensor V_PIN gradually increases.

The controller 10 turns on the first contactor M/C to activate the battery 2 in the first voltage state (800 V) at a timing when the pre-charging of the first smoothing capacitor C1 is completed, and then turns off the fifth contactor P/C. Accordingly, travel of the electric vehicle is enabled.

On the other hand, when the ignition switch IG is turned off, the controller 10 first turns off the first contactor M/C and checks the detected voltage value of the first voltage sensor V_PIN. When the detected voltage value of the first voltage sensor V_PIN does not decrease due to discharging of the first smoothing capacitor C1, the controller 10 determines that the first contactor M/C is welded and performs abnormality notification.

When the controller 10 determines that the first contactor M/C is not welded, the controller 10 turns on the fifth contactor P/C at a timing when the discharging of the first smoothing capacitor C1 is completed, and checks the detected voltage value of the first voltage sensor V_PIN. When the detected voltage value of the first voltage sensor V_PIN does not increase, the controller 10 determines that the fifth contactor P/C is welded and performs abnormality notification.

When the controller 10 determines that the fifth contactor P/C is not welded, the controller 10 turns off the second contactor S/C_A and the fifth contactor P/C and ends the operation sequence during traveling.

Figure 12:
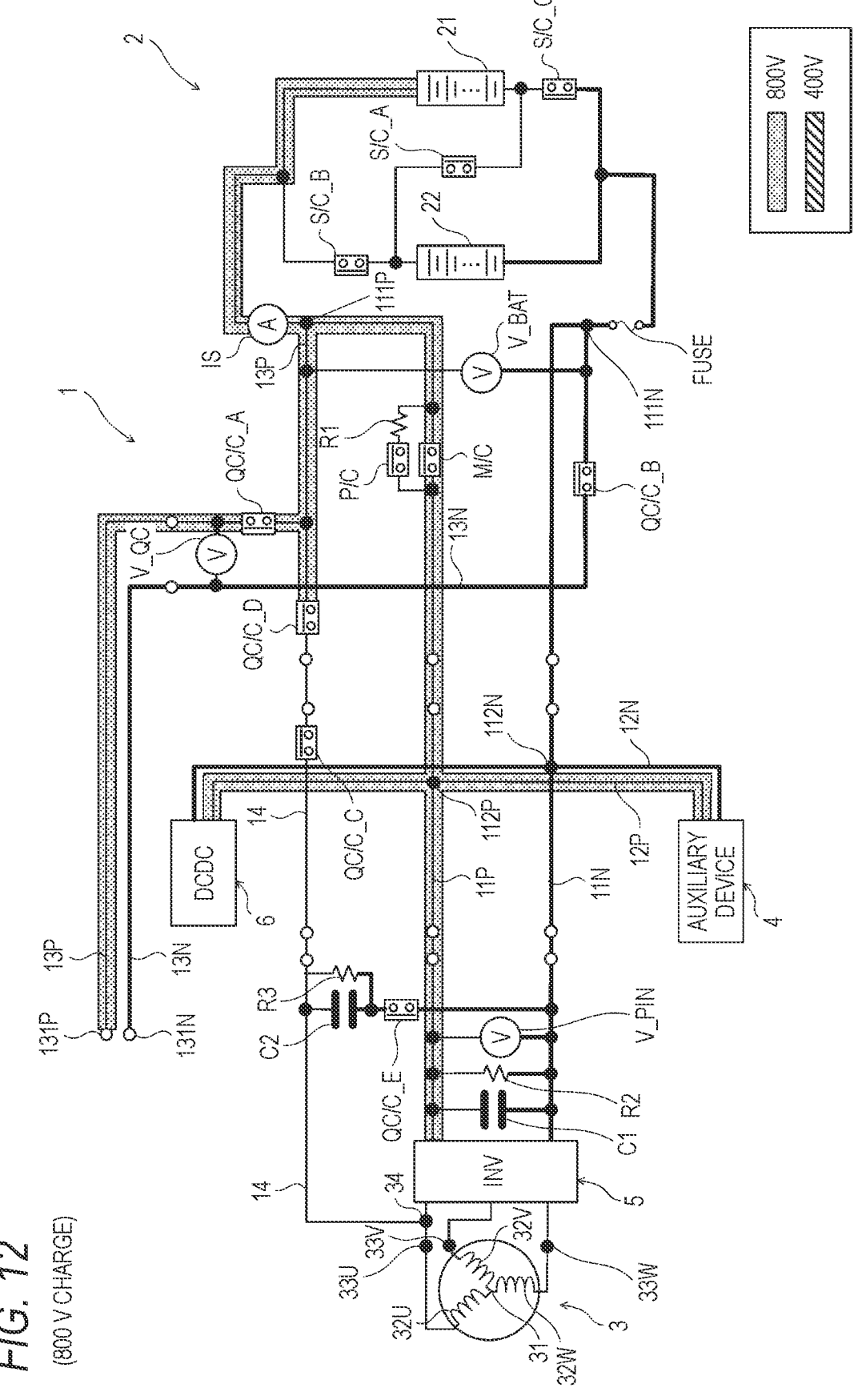
FIG. 12 is a diagram showing a flow of a current during charging at the first voltage (800 V) of the electric vehicle including the power storage system 1 according to the second embodiment.
Figure 15:
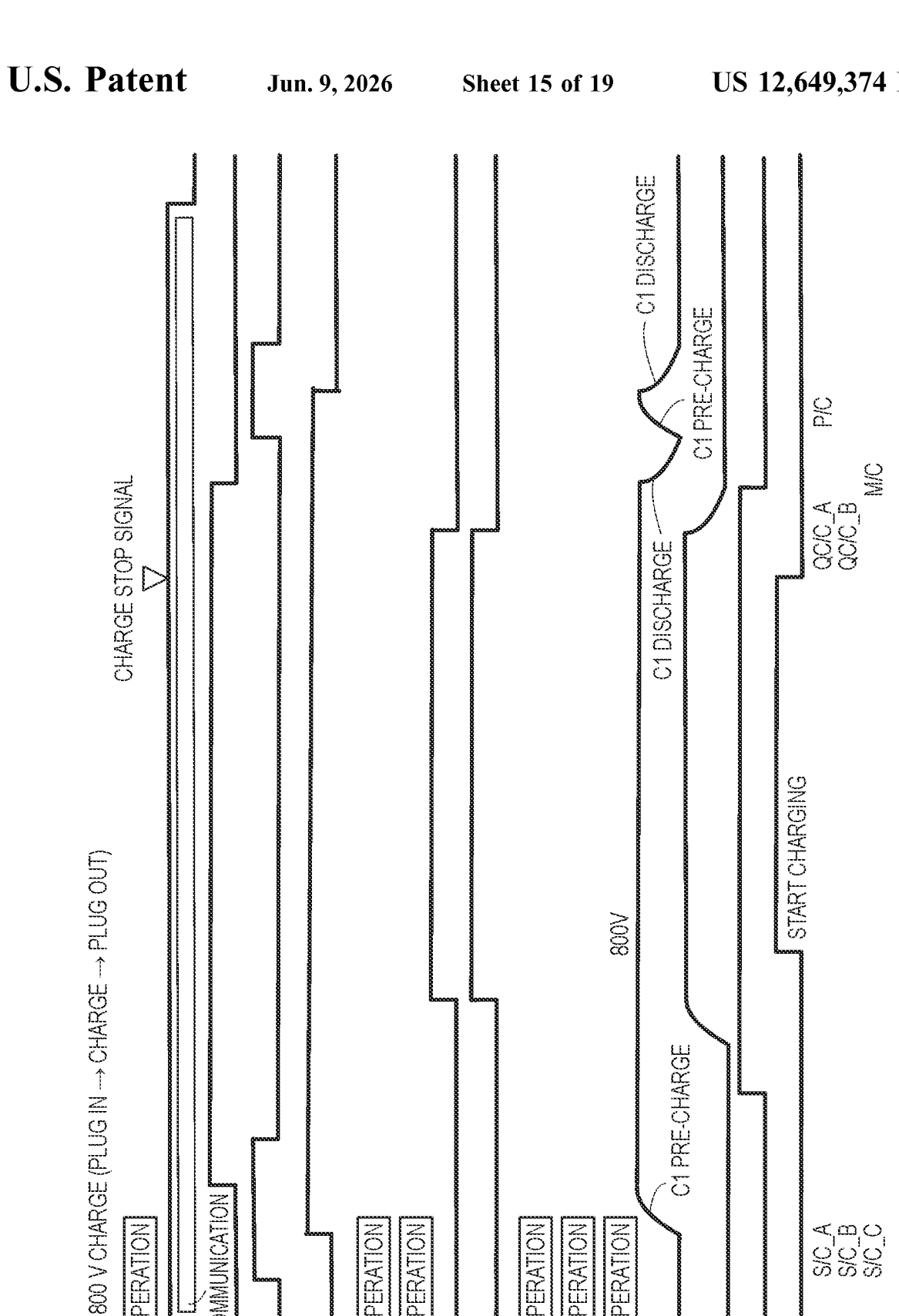
FIG. 15 is a diagram showing an operation sequence during charging at the first voltage (800 V) of the electric vehicle including the power storage system 1 according to the second embodiment.

FIG. 12 is diagram showing a flow of a current during charging at the first voltage (800 V charge) of the electric vehicle including the power storage system 1 according to the second embodiment, and FIG. 15 is a diagram showing an operation sequence during charging at the first voltage (800 V charge) of the electric vehicle including the power storage system 1 according to the second embodiment.

When a charge plug is connected to the charge terminals 131P and 131N, the controller 10 performs CAN communication with charging equipment to recognize a charge voltage. When the charge voltage is the first voltage (800 V), the controller 10 first turns on the fifth contactor P/C and checks the detected voltage value of the first voltage sensor V_PIN. When the detected voltage value of the first voltage sensor V_PIN increases, the controller 10 determines that any one of the second to fourth contactors S/C_A, S/C_B, and S/C_C is welded, and performs abnormality notification.

When the controller 10 determines that the second to fourth contactors S/C_A, S/C_B, and S/C_C are not welded, the controller 10 turns on the second contactor S/C_A and connects the circuit in the battery 2 in the first voltage state (800 V). When the circuit in the battery 2 is connected in the first voltage state (800 V), the first smoothing capacitor C1 is pre-charged, and the detected voltage value of the first voltage sensor V_PIN gradually increases.

The controller 10 turns on the first contactor M/C to activate the battery 2 in the first voltage state (800 V) after the pre-charging of the first smoothing capacitor C1 is completed, and then turns off the fifth contactor P/C. Accordingly, the battery 2 is in a state in which charging at the first voltage (800 V) can be started.

Thereafter, the controller 10 turns on the eighth contactor QC/C_A and the ninth contactor QC/C_B to start charging the battery 2 at the first voltage (800 V). In this case, the auxiliary device 4 is connected to the DC power supply circuits 13P and 13N via the auxiliary device drive circuits 12P and 12N and the first contactor M/C and is driven by the first voltage (800 V) supplied from the charging equipment.

On the other hand, when the controller 10 determines that a charge stop signal is received, the controller 10 turns off the eighth contactor QC/C_A and the ninth contactor QC/C_B and checks a detected voltage value of the third voltage sensor V_QC. When the detected voltage value of the third voltage sensor V_QC does not decrease, the controller 10 determines that the eighth contactor QC/C_A and the ninth contactor QC/C_B are welded and performs abnormality notification.

When the controller 10 determines that the eighth contactor QC/C_A and the ninth contactor QC/C_B are not welded, the controller 10 turns off the first contactor M/C and checks the detected voltage value of the first voltage sensor V_PIN. When the detected voltage value of the first voltage sensor V_PIN does not decrease due to discharging of the first smoothing capacitor C1, the controller 10 determines that the first contactor M/C is welded and performs abnormality notification.

When the controller 10 determines that the first contactor M/C is not welded, the controller 10 turns on the fifth contactor P/C at a timing when the discharging of the first smoothing capacitor C1 is completed, and checks the detected voltage value of the first voltage sensor V_PIN. When the detected voltage value of the first voltage sensor V_PIN does not increase, the controller 10 determines that the fifth contactor P/C is welded and performs abnormality notification.

When the controller 10 determines that the fifth contactor P/C is not welded, the controller 10 turns off the second contactor S/C_A and the fifth contactor P/C and ends the operation sequence during charging at the first voltage (800 V).

Figure 13:
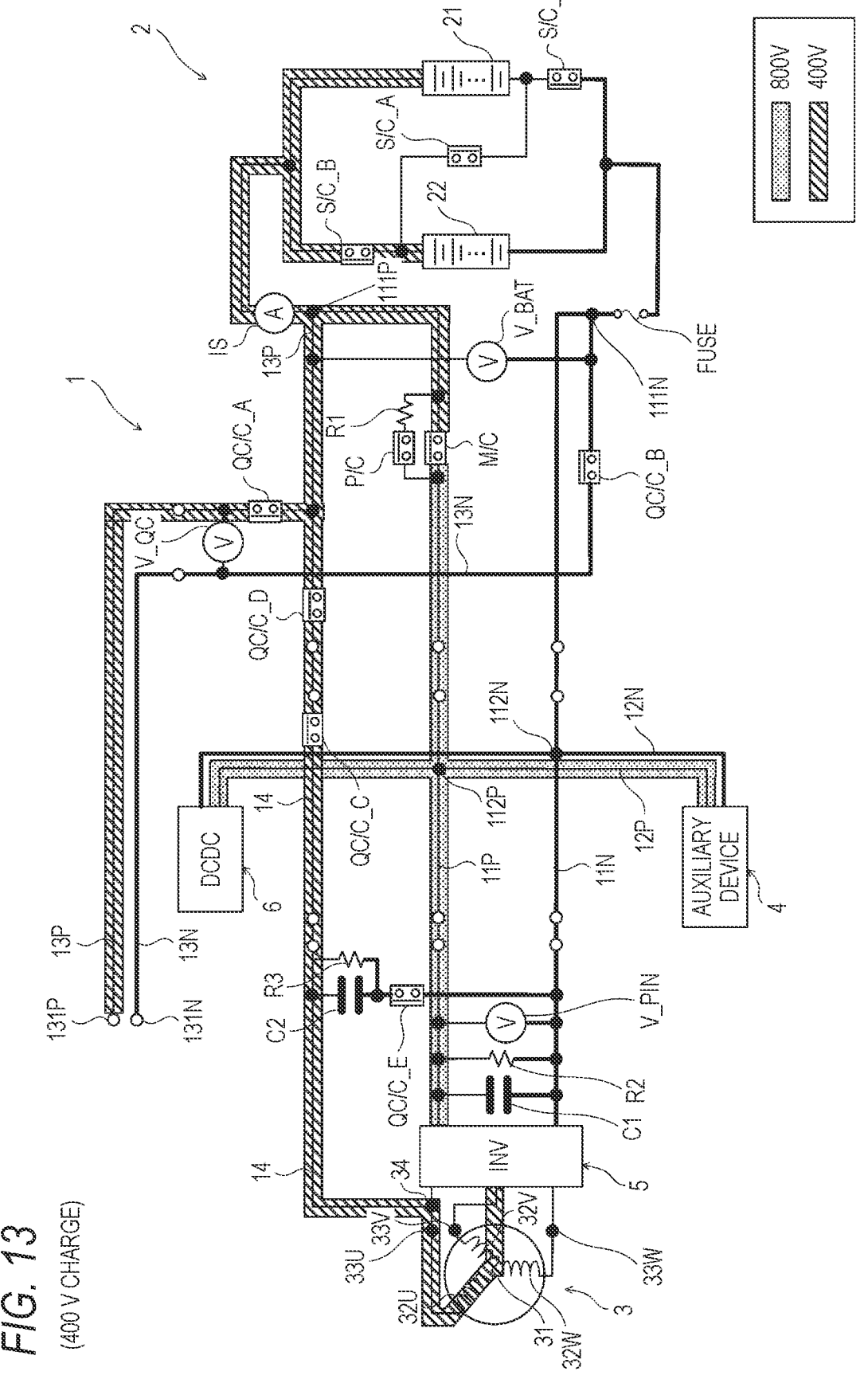
FIG. 13 is a diagram showing a flow of a current during charging at the second voltage (400 V) of the electric vehicle including the power storage system 1 according to the second embodiment.
Figure 16:
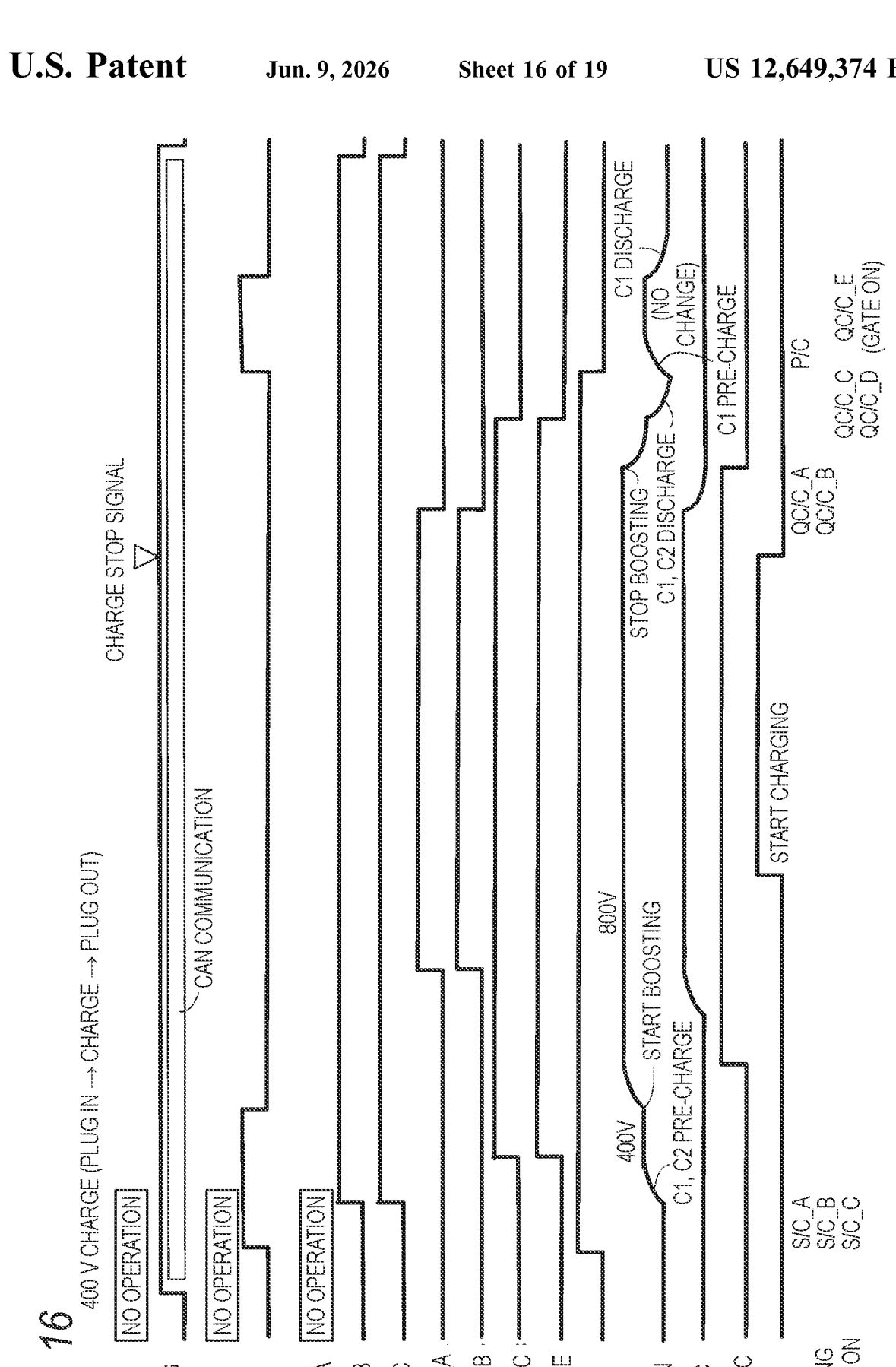
FIG. 16 is a diagram showing an operation sequence during charging at the second voltage (400 V) of the electric vehicle including the power storage system 1 according to the second embodiment.

FIG. 13 is a diagram showing a flow of a current during charging at the second voltage (400 V charge) of the electric vehicle including the power storage system 1 according to the second embodiment, and FIG. 16 is a diagram showing an operation sequence during charging at the second voltage (400 V charge) of the electric vehicle including the power storage system 1 according to the second embodiment.

When a charge plug is connected to the charge terminals 131P and 131N, the controller 10 performs CAN communication with charging equipment to recognize a charge voltage. When the charge voltage is the second voltage (400 V), the controller 10 turns on the fifth contactor P/C and the eleventh contactor QC/C_E, and checks the detected voltage value of the first voltage sensor V_PIN. When the detected voltage value of the first voltage sensor V_PIN increases, the controller 10 determines that any one of the second to fourth contactors S/C_A, S/C_B, and S/C_C is welded, and performs abnormality notification.

When the controller 10 determines that there is no welding of the second to fourth contactors S/C_A, S/C_B, and S/C_C, the controller 10 turns on the third contactor S/C_B and the fourth contactor S/C_C to connect the circuit in the battery 2 in the second voltage state (400 V), and then turns on the tenth contactor QC/C_C and the twelfth contactor QC/C_D and then turns off the fifth contactor P/C. After enabling the booster circuit by the three-phase motor 3 and the inverter 5, the controller 10 turns on the eighth contactor QC/C_A and the ninth contactor QC/C_B. Accordingly, the battery 2 is in a state in which charging at the second voltage (400 V) can be started. The three-phase motor 3 and the inverter 5 connected to the DC power supply circuits 13P and 13N via the branch circuit 14 boost the second voltage (400 V) supplied from the charging equipment to the first voltage (800 V) to drive the auxiliary device 4.

On the other hand, when the controller 10 determines that a charge stop signal is received, the controller 10 turns off the eighth contactor QC/C_A and the ninth contactor QC/C_B and checks a detected voltage value of the third voltage sensor V_QC. When the detected voltage value of the third voltage sensor V_QC does not decrease, the controller 10 determines that the eighth contactor QC/C_A and the ninth contactor QC/C_B are welded and performs abnormality notification.

When the controller 10 determines that the eighth contactor QC/C_A and the ninth contactor QC/C_B are not welded, the controller 10 stops the boosting performed by the three-phase motor 3 and the inverter 5, then turns off the tenth contactor QC/C_C and the twelfth contactor QC/C_D, and checks the detected voltage value of the first voltage sensor V_PIN. When the detected voltage value of the first voltage sensor V_PIN does not decrease, the controller 10 determines that the tenth contactor QC/C_C and the twelfth contactor QC/C_D are welded and performs abnormality notification.

When the controller 10 determines that the tenth contactor QC/C_C and the twelfth contactor QC/C_D are not welded, the controller 10 turns on the fifth contactor P/C and turns off the eleventh contactor QC/C_E, and checks the detected voltage value of the first voltage sensor V_PIN. When the detected voltage value of the first voltage sensor V_PIN does not increase, the controller 10 determines that the fifth contactor P/C is welded and performs abnormality notification.

When the controller 10 determines that the fifth contactor P/C is not welded, after the detected voltage value of the first voltage sensor V_PIN is increased by the pre-charging of the first smoothing capacitor C1, the controller 10 turns on the gate of the inverter 5 and checks the detected voltage value of the first voltage sensor V_PIN again. When the detected voltage value of the first voltage sensor V_PIN changes in response to the turn-on of the gate of the inverter 5, the controller 10 determines that the eleventh contactor QC/C_E is welded, and performs abnormality notification.

When the controller 10 determines that the eleventh contactor QC/C_E is not welded, the controller 10 turns off the fifth contactor P/C, the third contactor S/C_B and the fourth contactor S/C_C and ends the operation sequence during charging at the second voltage (400 V).

Next, a first modification and a second modification of the power storage system 1 of the first embodiment will be described. Note that the same reference numerals as in the first embodiment are used for the same configurations as in the first embodiment, and description thereof will be omitted, and only changes will be described.

Figure 17:
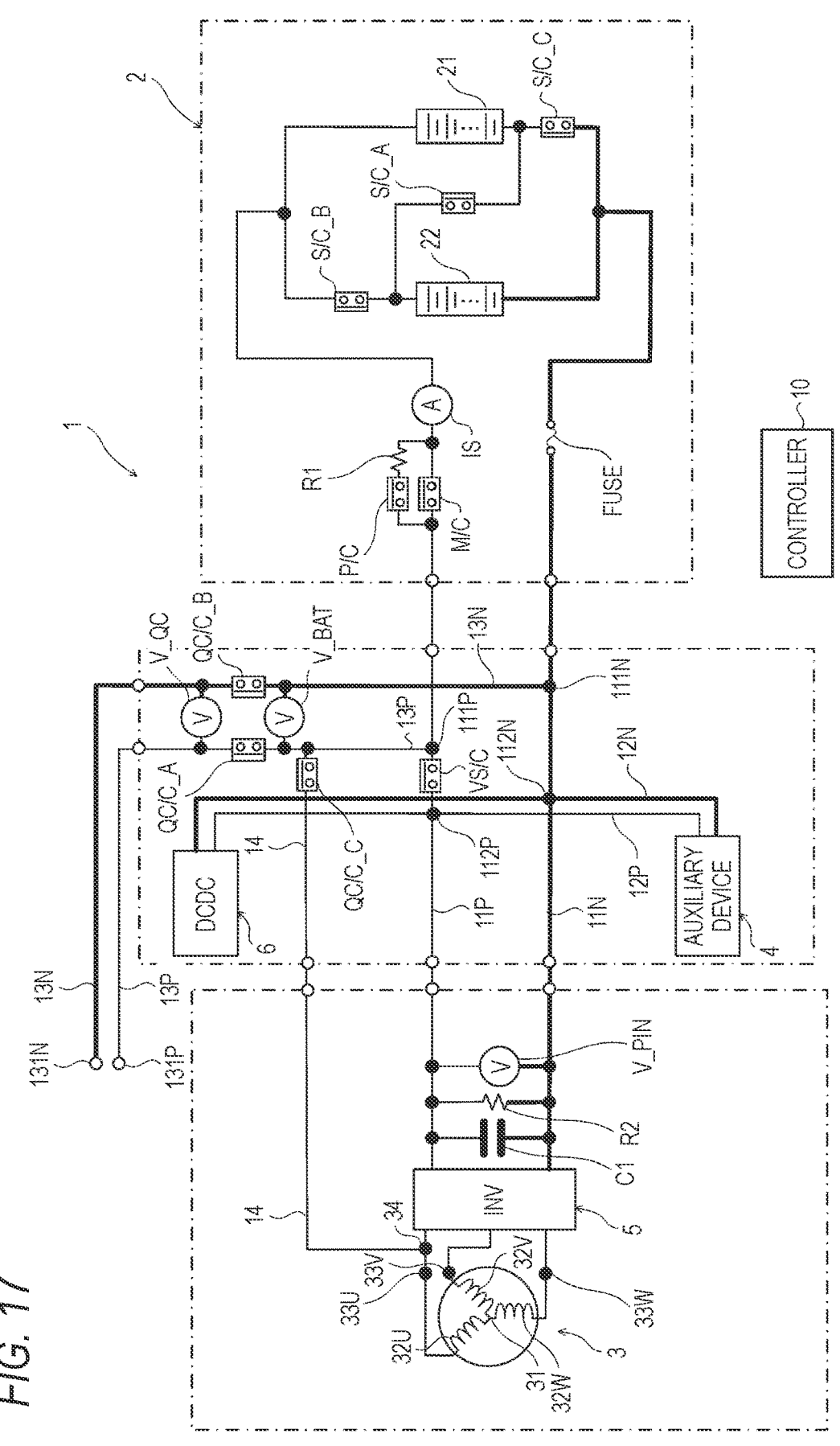
FIG. 17 is a diagram showing a configuration of a first modification of the power storage system 1 according to the first embodiment.

FIG. 17 is a diagram showing a configuration of the first modification of the power storage system 1 according to the first embodiment.

In the power storage system 1 of the first embodiment shown in FIG. 1, the eleventh contactor QC/C_E and the second smoothing capacitor C2 are provided in series on the circuit connecting the electric power supply circuit 11N on the negative side and the branch circuit 14, and the third resistor R3 is provided in parallel with the second smoothing capacitor C2. However, in the first modification of the power storage system 1 of the first embodiment shown in FIG. 17, the eleventh contactor QC/C_E, the second smoothing capacitor C2, and the third resistor R3 are not provided. Therefore, the number of components can be reduced, and the power storage system 1 can be made lighter. Layout of the power storage system 1 is also improved.

Figure 18:
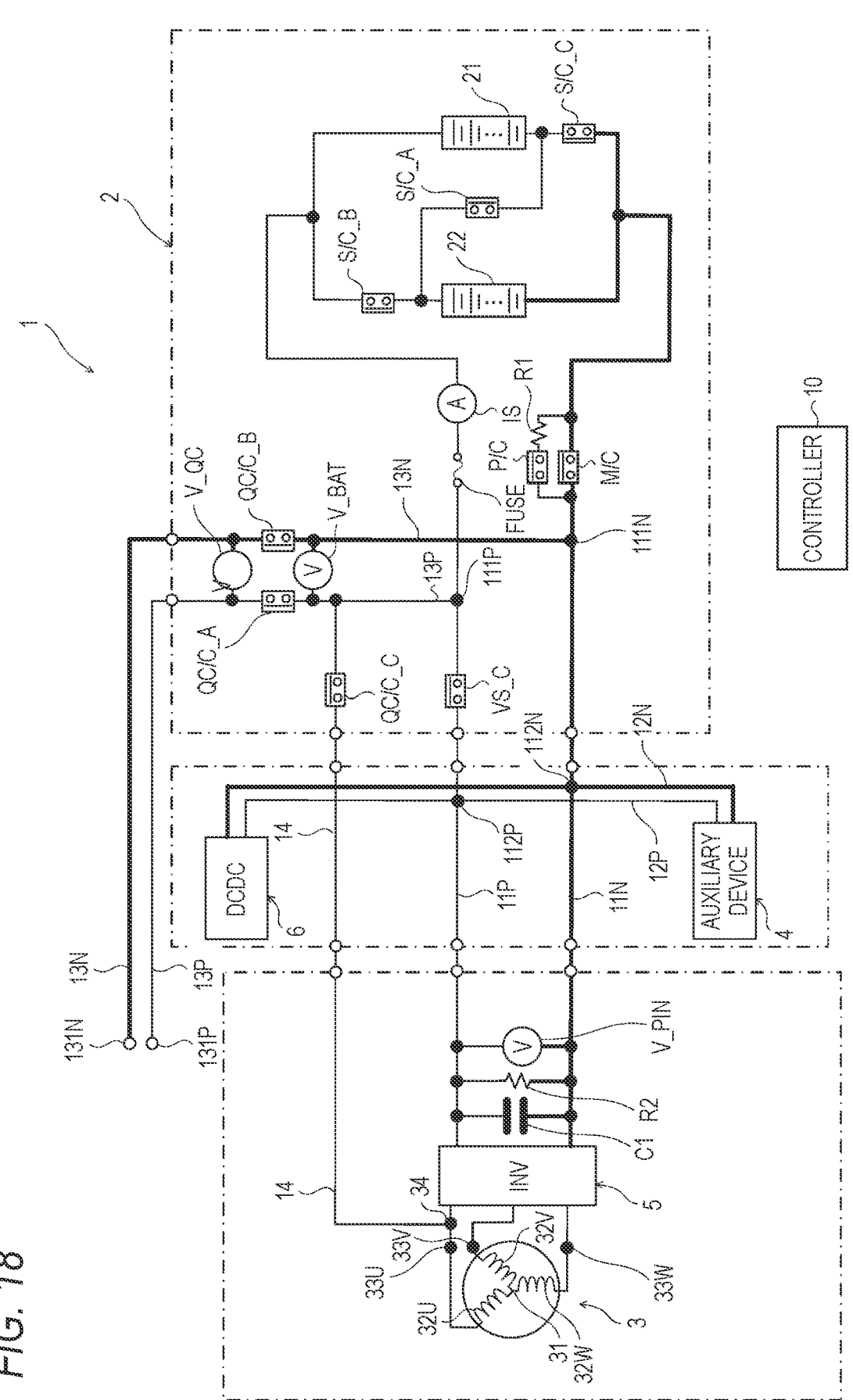
FIG. 18 is a diagram showing a configuration of a second modification of the power storage system 1 according to the first embodiment.

FIG. 18 is a diagram showing a configuration of the second modification of the power storage system 1 according to the first embodiment.

In addition to the matter that the eleventh contactor QC/C_E, the second smoothing capacitor C2, and the third resistor R3 are not provided, which is similar to the first modification, the second modification of the power storage system 1 of the first embodiment shown in FIG. 18 differs from the power storage system 1 of the first embodiment shown in FIG. 1 also in the following points.

In the power storage system 1 of the first embodiment shown in FIG. 1, the first contactor M/C, and the fifth contactor P/C and the first resistor R1 arranged in parallel with the first contactor M/C are provided on the positive end portion of the battery 2, and the current breaker FUSE is provided on the negative end portion of the battery 2. However, in the present modification, as shown in FIG. 18, the first contactor M/C, and the fifth contactor P/C and the first resistor R1 arranged in parallel with the first contactor M/C are provided on the negative side of the battery 2, and the current breaker FUSE is provided on the positive side of the battery 2. Furthermore, as a configuration of the battery 2, the seventh contactor VS/C, the eighth contactor QC/C_A, the ninth contactor QC/C_B, the tenth contactor QC/C_C, the third voltage sensor V_QC, and the second voltage sensor V_BAT are provided closer to the end portion side than the first contactor MI/C and the current breaker FUSE.

In the power storage system 1 of the first embodiment shown in FIG. 1, when the power of the battery 2 is cut off such as when the battery 2 fails, in other words, when the electric power supply to the outside of the battery 2 is cut off, it is necessary to turn off the first contactor M/C provided at the positive end portion of the battery 2 and to cut off the current breaker FUSE provided at the negative end portion of the battery 2. Once the current breaker FUSE is cut, replacement is necessary.

In the present modification, when cutting off the power of the battery 2, the seventh contactor VS/C and the eighth contactor QC/C_A, which are provided on the positive side of the battery 2 and closer to the end portion side than the current breaker FUSE, are turned off, and the first contactor M/C provided on the negative side of the battery 2 is turned off, so that the power of the battery 2 can be cut off without cutting off the current breaker FUSE. In this way, according to the present modification, the power of the battery 2 can be cut off only by ON/OFF control of the contactors, and therefore, control can be simplified and replacement of the current breaker FUSE can be made unnecessary.

Next, a modification of the power storage system 1 of the second embodiment will be described. Note that the same reference numerals as in the second embodiment are used for the same configurations as in the second embodiment, and description thereof will be omitted, and only changes will be described.

Figure 19:
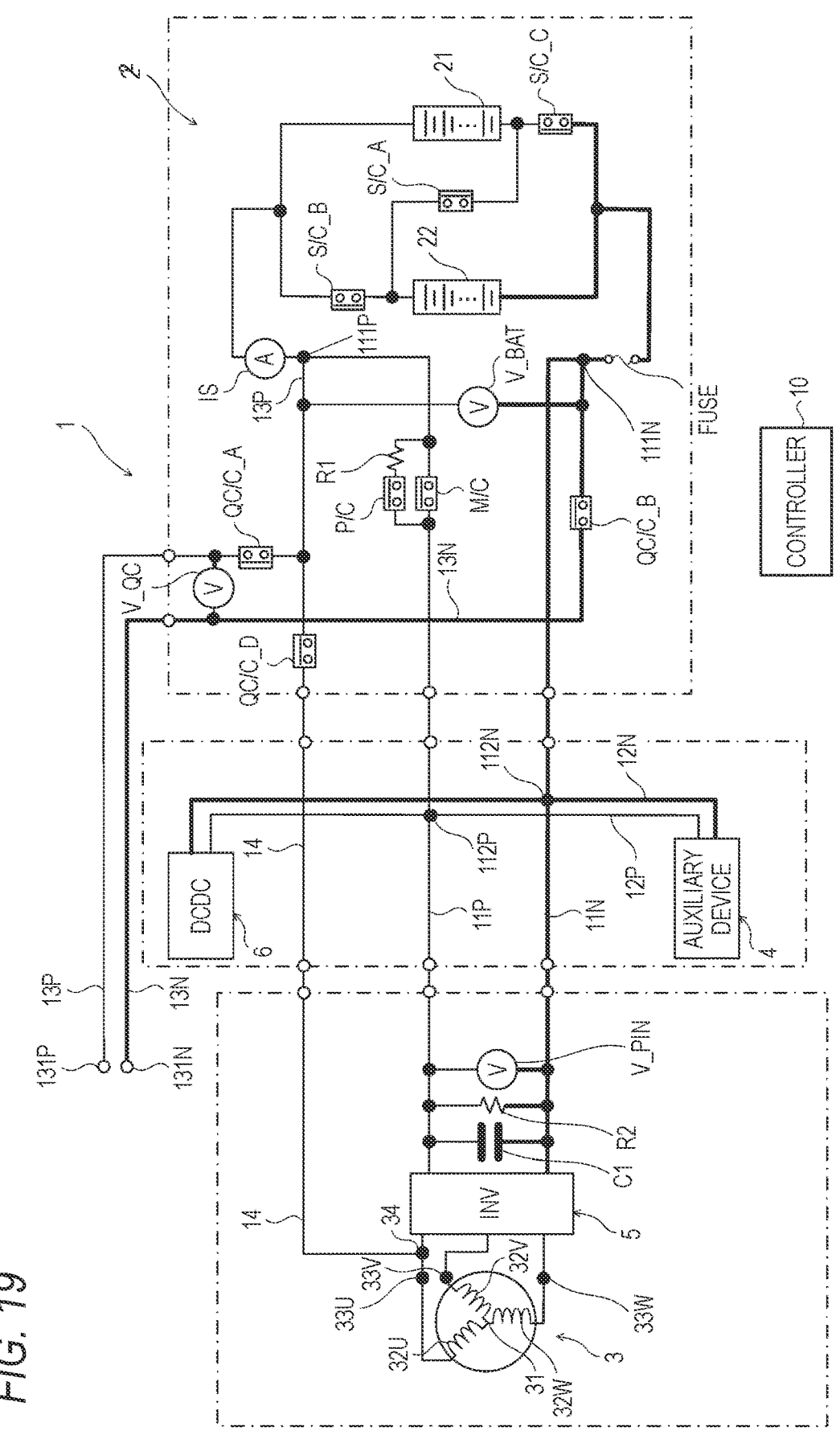
FIG. 19 is a diagram showing a configuration of a modification of the power storage system 1 according to the second embodiment.

FIG. 19 is a diagram showing a configuration of the modification of the power storage system 1 according to the second embodiment.

In the power storage system 1 of the second embodiment shown in FIG. 10, the eleventh contactor QC/C_E and the second smoothing capacitor C2 are provided in series on the circuit connecting the electric power supply circuit 11N on the negative side and the branch circuit 14, and the third resistor R3 is provided in parallel with the second smoothing capacitor C2. However, in the modification of the power storage system 1 of the second embodiment shown in FIG. 19, the eleventh contactor QC/C_E, the second smoothing capacitor C2, and the third resistor R3 are not provided. Therefore, the number of components can be reduced, and the power storage system 1 can be made lighter. Layout of the power storage system 1 is also improved.

Although various embodiments have been described above with reference to the drawings, it is needless to say that the present invention is not limited to these examples. It is apparent that those skilled in the art can conceive of various modifications and changes within the scope described in the claims, and it is understood that such modifications and changes naturally fall within the technical scope of the present invention. In addition, respective constituent elements in the above-described embodiment may be freely combined without departing from the gist of the invention.

For example, in the above embodiment, the controller 10 performs CAN communication with the charging equipment, but the communication method is not limited to CAN communication, and any communication method can be adopted.

In the present description, at least the following matters are described. Although corresponding constituent elements or the like in the above-described embodiments are shown in parentheses, the present invention is not limited thereto.

(1) A power storage system (power storage system 1) including:

a battery (battery 2) including a first power storage (first power storage 21), a second power storage (second power storage 22), and a first switch unit (second contactor S/C_A, third contactor S/C_B, and fourth contactor S/C_C) configured to switch between a first voltage state in which the first power storage and the second power storage are connected in series and chargeable at a first voltage, and a second voltage state in which the first power storage and the second power storage are connected in parallel and chargeable at a second voltage;

a three-phase motor (three-phase motor 3) in which coils (coils 32U, 32V, and 32W) of three phases are connected at a neutral point (neutral point 31), the three-phase motor being driven by electric power supplied from the battery;

an inverter (inverter 5) connected on an electric power transmission path (electric power supply circuits 11P and 11N) between the battery and the three-phase motor; and a DC power supply circuit (DC power supply circuits 13P and 13N) connected to a first connection portion (connection portions 111P and 111N) positioned on an electric power transmission path between the inverter and the battery, in which the DC power supply circuit has a branch circuit (branch circuit 14) connected to a coil of any one phase among the coils of three phases at a positive electrode side of the DC power supply circuit.

According to (1), it is possible to appropriately perform charging according to a voltage state of charging equipment by switching, by the first switch unit, a mode of connection between the first power storage and the second power storage both in a system in which the external charging equipment performs charging at the first voltage or a system in which the external charging equipment performs charging at the second voltage. That is, charging can be performed without passing through any voltage converter during charging, efficiency deterioration due to a voltage converter can be avoided, and it is possible to eliminate a voltage converter for charging.

Since the DC power supply circuit on the positive side connected to the connection portion positioned on the electric power transmission path between the inverter and the battery includes the branch circuit connected to the coil of any one phase of the three-phase motor, voltage conversion can be performed using the three-phase motor and the inverter. Accordingly, even when the voltage state of the charging equipment is different from an operating voltage of an auxiliary device or the like, it is possible to eliminate a dedicated voltage converter, and thus a manufacturing cost can be reduced.

(2) The power storage system according to (1), in which the branch circuit is connected to a coil of any one phase among the coils of three phases at a second connection portion (connection portion 34) via a second switch unit (tenth contactor QC/C_C).

According to (2), when the three-phase motor does not perform voltage conversion, that is, when the coils of the three-phase motor are not used as transformers, a connection to the second connection portion can be cut off.

(3) The power storage system according to (2)

in which the branch circuit is connected to an electric power transmission path (electric power supply circuit 11N) at a negative electrode side between the inverter and the battery via a fourth switch unit (eleventh contactor QC/C_E) and a capacitor (second smoothing capacitor C2).

According to (3), it is possible to perform failure detection of the second switch unit.

(4) The power storage system according to (1), further including:

an auxiliary device (auxiliary device 4) configured to be driven by DC electric power from the battery and an external power supply; and an auxiliary device drive circuit (auxiliary device drive circuits 12P, 12N) connected on an electric power transmission path between the inverter and the first connection portion, and configured to supply electric power to the auxiliary device, in which the auxiliary device is operated at the first voltage.

According to (4), it is unnecessary to perform voltage conversion during traveling and during charging at the first voltage.

(5) The power storage system according to (4), in which the auxiliary device is connected to the battery via a third switch unit (seventh contactor VS/C in first embodiment and first contactor M/C in second embodiment).

According to (5), when voltage conversion is performed by the three-phase motor, that is, when the coils of the three-phase motor are used as transformers, the third switch unit can separate a portion in the first voltage state from a portion in the second voltage state.

(6) The power storage system according to any one of (1) to (5), further including:

a controller (controller 10) configured to control the first switch unit and the inverter, in which when the battery is charged at the second voltage, the controller causes the inverter to boost a voltage supplied from the branch circuit to the three-phase motor to the first voltage.

According to (6), since voltage conversion can be performed using the three-phase motor and the inverter, it is possible to eliminate an auxiliary device voltage converter.

What is claimed is:

1. A power storage system comprising:

a battery including a first power storage, a second power storage, and a first switch unit configured to switch between a first voltage state in which the first power storage and the second power storage are connected in series and chargeable at a first voltage, and a second voltage state in which the first power storage and the second power storage are connected in parallel and chargeable at a second voltage;

a three-phase motor in which coils of three phases are connected at a neutral point, the three-phase motor being driven by electric power supplied from the battery;

an inverter connected on an electric power transmission path between the battery and the three-phase motor; and a DC power supply circuit connected to a first connection portion positioned on an electric power transmission path between the inverter and the battery, wherein the DC power supply circuit has a branch circuit connected to a coil of any one phase among the coils of three phases at a positive electrode side of the DC power supply circuit, wherein the branch circuit is connected to a coil of any one phase among the coils of three phases at a second connection portion via a second switch unit, and wherein the branch circuit is connected to an electric power transmission path at a negative electrode side between the inverter and the battery via a fourth switch unit and a capacitor.

2. The power storage system according to claim 1, further comprising:

an auxiliary device configured to be driven by DC electric power from the battery and an external power supply; and an auxiliary device drive circuit connected on an electric power transmission path between the inverter and the first connection portion, and configured to supply electric power to the auxiliary device, wherein the auxiliary device is operated at the first voltage.

3. The power storage system according to claim 2, wherein the auxiliary device is connected to the battery via a third switch unit.

4. The power storage system according to claim 1, further comprising:

a controller configured to control the first switch unit and the inverter, wherein when the battery is charged at the second voltage, the controller causes the inverter to boost a voltage supplied from the branch circuit to the three-phase motor to the first voltage.

* * * * *